United States Patent
van Baarsen et al.

(10) Patent No.: US 7,512,287 B2
(45) Date of Patent: Mar. 31, 2009

(54) METHOD AND APPARATUS FOR EFFICIENT IMAGE ROTATION

(75) Inventors: John Peter van Baarsen, Delta (CA); Barinder Singh Rai, Surrey (CA); Jimmy Kwok Lap Lai, Vancouver (CA)

(73) Assignee: Seiko Epson Corporation, Tokyo (JP)

(*) Notice: Subject to any disclaimer, the term of this patent is extended or adjusted under 35 U.S.C. 154(b) by 386 days.

(21) Appl. No.: 11/188,531

(22) Filed: Jul. 25, 2005

(65) Prior Publication Data

US 2007/0019005 A1    Jan. 25, 2007

(51) Int. Cl.
*G09G 5/00* (2006.01)
*G06K 9/32* (2006.01)

(52) U.S. Cl. .................. 382/296; 345/649

(58) Field of Classification Search .......... 382/296; 345/649
See application file for complete search history.

(56) References Cited

U.S. PATENT DOCUMENTS

| | | | |
|---|---|---|---|
| 5,111,192 A | 5/1992 | Kadakia | 345/658 |
| 5,910,794 A * | 6/1999 | Schneider | 345/656 |
| 5,966,116 A | 10/1999 | Wakeland | 345/658 |
| 6,643,415 B1 | 11/2003 | Fukai et al. | 382/296 |
| RE38,896 E * | 11/2005 | Anderson | 348/272 |
| 7,376,289 B2 | 5/2008 | Tsumura et al. | |
| 2001/0017946 A1 * | 8/2001 | Klassen | 382/296 |
| 2005/0249435 A1 * | 11/2005 | Rai et al. | 382/296 |

FOREIGN PATENT DOCUMENTS

CN    1604053    4/2005

* cited by examiner

*Primary Examiner*—Samir A. Ahmed
*Assistant Examiner*—Stephen R Koziol
(74) *Attorney, Agent, or Firm*—Mark P. Watson

(57) ABSTRACT

The invention is generally directed to a method and apparatus for efficient rotation of an image. The image is preferably defined by an image matrix in which each datum of the image corresponds to a particular image row and a particular image column of the image matrix. A preferred method includes mapping each of the datum into a memory matrix organized into a plurality of memory rows and a plurality of memory columns. The mapping preferably includes mapping into one of the memory rows: (a) at least two data, both of which correspond to one of the image rows, and (b) at least two image vector portions, a first one of the image vector portions including at least two data each corresponding to one of the image columns, and a second one of the image vector portions including at least two other data each corresponding to another of the image columns. In addition, preferably the at least two data of the first image vector portion and the at least two other data of the second image vector portion each respectively correspond to the same image rows.

18 Claims, 20 Drawing Sheets

|   | 1 | 2 | 3 | 4 | 5 | 6 | 7 | 8 | 9 |
|---|---|---|---|---|---|---|---|---|---|
| 1 | $P_{1,1}$ | $P_{1,2}$ | $P_{1,3}$ | $P_{1,4}$ | $P_{1,5}$ | $P_{1,6}$ | $P_{1,7}$ | $P_{1,8}$ | $P_{1,9}$ |
| 2 | $P_{2,1}$ | $P_{2,2}$ | $P_{2,3}$ | $P_{2,4}$ | $P_{2,5}$ | $P_{2,6}$ | $P_{2,7}$ | $P_{2,8}$ | $P_{2,9}$ |
| 3 | $P_{3,1}$ | $P_{3,2}$ | $P_{3,3}$ | $P_{3,4}$ | $P_{3,5}$ | $P_{3,6}$ | $P_{3,7}$ | $P_{3,8}$ | $P_{3,9}$ |
| 4 | $P_{4,1}$ | $P_{4,2}$ | $P_{4,3}$ | $P_{4,4}$ | $P_{4,5}$ | $P_{4,6}$ | $P_{4,7}$ | $P_{4,8}$ | $P_{4,9}$ |
| 5 | $P_{5,1}$ | $P_{5,2}$ | $P_{5,3}$ | $P_{5,4}$ | $P_{5,5}$ | $P_{5,6}$ | $P_{5,7}$ | $P_{5,8}$ | $P_{5,9}$ |
| 6 | $P_{6,1}$ | $P_{6,2}$ | $P_{6,3}$ | $P_{6,4}$ | $P_{6,5}$ | $P_{6,6}$ | $P_{6,7}$ | $P_{6,8}$ | $P_{6,9}$ |
| 7 | $P_{7,1}$ | $P_{7,2}$ | $P_{7,3}$ | $P_{7,4}$ | $P_{7,5}$ | $P_{7,6}$ | $P_{7,7}$ | $P_{7,8}$ | $P_{7,9}$ |
| 8 | $P_{8,1}$ | $P_{8,2}$ | $P_{8,3}$ | $P_{8,4}$ | $P_{8,5}$ | $P_{8,6}$ | $P_{8,7}$ | $P_{8,8}$ | $P_{8,9}$ |
| 9 | $P_{9,1}$ | $P_{9,2}$ | $P_{9,3}$ | $P_{9,4}$ | $P_{9,5}$ | $P_{9,6}$ | $P_{9,7}$ | $P_{9,8}$ | $P_{9,9}$ |
| 10 | $P_{10,1}$ | $P_{10,2}$ | $P_{10,3}$ | $P_{10,4}$ | $P_{10,5}$ | $P_{10,6}$ | $P_{10,7}$ | $P_{10,8}$ | $P_{10,9}$ |
| 11 | $P_{11,1}$ | $P_{11,2}$ | $P_{11,3}$ | $P_{11,4}$ | $P_{11,5}$ | $P_{11,6}$ | $P_{11,7}$ | $P_{11,8}$ | $P_{11,9}$ |

FIG. 2

METHOD AND APPARATUS FOR EFFICIENT IMAGE ROTATION

FIELD OF THE INVENTION

The present invention relates to a method and apparatus for efficient rotation of an image in a graphics display system. In particular, preferred embodiments relate to methods and apparatus for organizing image data in a memory in such ways that the data may be efficiently fetched for both rotation and non-rotation of the image.

BACKGROUND

Graphics display systems, particularly inexpensive, hand-held, battery powered digital devices ("portable digital appliance") such as mobile or cellular telephones, typically employ a graphics controller as an interface between one or more providers of image data and a graphics display device such as an LCD panel or panels. The providers of image data are typically a host, such as a CPU, and a camera. The host and camera transmit image data to the graphics controller for ultimate display on the display device. The display device is adapted for displaying on its display areas pixels of digital image data ("pixel data"). The host also transmits control data to both the graphics controller and the camera to control the operation of these devices. Commonly, the graphics controller is a separate integrated circuit ("IC") and the graphics controller, the host, and the camera are all remote from one another.

The graphics controller provides various processing options for processing image data received from the host and camera. For example, the graphics controller may compress or decompress, e.g., JPEG encode or decode, incoming or outgoing image data, crop the image data, resize the image data, scale the image data, and color convert the image data according to one of a number of alternative color conversion schemes.

The graphics controller often includes an embedded memory for storing image data received from the image data source. In addition, the memory for storing image data received from the image data source may be located in a separate IC from the graphics controller IC. The image data may stored in a frame buffer portion of the memory for subsequent fetching and transmission to the display device. In addition, image processing operations may be performed on the data before it is stored in memory, or the data may be fetched from the memory for image processing operations and then transmitted to the display device or restored in the memory. The memory is organized as a 2-dimensional matrix having rows and columns. The pixel data stored at a given row and column in the memory are mapped into a corresponding row and column of the display device. In general, the memory may be Dynamic Random Access Memory ("DRAM"), Synchronous DRAM ("SDRAM"), or Static RAM ("SRAM"). SRAM is faster than DRAM and SDRAM, but more expensive. Accordingly, DRAM and SDRAM are frequently employed for storing image data.

DRAM and SDRAM store data on capacitors which, due to leakage, must be periodically recharged or refreshed. With DRAM and SDRAM, row address select ("RAS") and "precharge" cycles are required before a memory location may be accessed. After the RAS and precharge cycles are complete, data may be written to, or read from, the row in a "burst mode" that sequentially steps through the columns within the row from a given starting point. An entire row in the DRAM is alternatively referred to as a "page."

Conventionally, the host and camera provide image data to the graphics controller in raster scan order, that is, pixels are provided from side-to-side in lines from top-to-bottom. The raster ordered pixel data are also generally stored in sequential memory locations, that is from side-to-side in sequential rows of the memory. Further, the pixel data are generally fetched for processing or transmission to the display device in raster order. Fetching image data in raster order, which was presented for storage in raster order and which was stored from side-to-side in sequential rows of the memory, is efficient. The reason is that the data may be fetched a row at a time in burst mode.

However, graphics display systems commonly provide for image rotation. If an image is stored in memory in raster order, when the image is rotated, the image data must be fetched in a different order from which it was stored. In order to write a single line of a rotated image to the display, pixel data must be fetched from a large number of different rows of the memory. Generally, since each page change in a DRAM or SDRAM requires RAS and precharge cycles, image rotation significantly reduces the efficiency of data fetches when using a DRAM memory.

There is therefore for a need for a method and apparatus for efficient rotation of an image in a graphics display system.

SUMMARY

The invention is generally directed to a method and apparatus for efficient rotation of an image. The image is preferably defined by an image matrix in which each datum of the image corresponds to a particular image row and a particular image column of the image matrix. A preferred method includes mapping each of the datum into a memory matrix organized into a plurality of memory rows and a plurality of memory columns. The mapping preferably includes mapping into one of the memory rows: (a) at least two data, both of which correspond to one of the image rows, and (b) at least two image vector portions, a first one of the image vector portions including at least two data each corresponding to one of the image columns, and a second one of the image vector portions including at least two other data each corresponding to another of the image columns. In addition, preferably the at least two data of the first image vector portion and the at least two other data of the second image vector portion each respectively correspond to the same image rows.

A preferred graphics controller providing for efficient rotation of an image includes a memory organized into a plurality of memory rows and a plurality of memory columns and a memory storage scheme controller. The memory storage scheme controller is adapted for mapping each of the datum into a memory matrix according to a particular mapping scheme. The memory matrix is preferably organized into a plurality of memory rows and a plurality of memory columns, and the mapping scheme includes mapping into one of the memory rows: (a) at least two data, both of which correspond to one of the image rows, and (b) at least two image vector portions, a first one of the image vector portions including at least two data each corresponding to one of the image columns, and a second one of the image vector portions including at least two other data each corresponding to another of the image columns. In addition, preferably the at least two data of the first image vector portion and the at least two other data of the second image vector portion each respectively correspond to the same image rows.

A graphics display system providing for efficient rotation of an image includes an image provider for providing data, a graphics display device for rendering the data, a memory organized into a plurality of memory rows and a plurality of memory columns, and a graphics controller. Preferably, the graphics controller includes a memory storage scheme controller for mapping each of the datum into a memory matrix according to a particular mapping scheme. The memory matrix is preferably organized into a plurality of memory rows and a plurality of memory columns, and the mapping scheme includes mapping into one of the memory rows: (a) at least two data, both of which correspond to one of the image rows, and (b) at least two image vector portions, a first one of the image vector portions including at least two data each corresponding to one of the image columns, and a second one of the image vector portions including at least two other data each corresponding to another of the image columns. In a preferred embodiment, the image provider and the display device are remote from the graphics controller. In addition, the at least two data of the first image vector portion and the at least two other data of the second image vector portion each respectively correspond to the same image rows.

In a preferred embodiment, the invention is directed to a machine readable medium embodying a program of instructions for execution by a machine, the program of instructions incorporating a method providing for efficient rotation of an image. Preferably, the method embodied in the medium includes mapping each of the datum into a memory matrix organized into a plurality of memory rows and a plurality of memory columns. The mapping preferably includes mapping into one of the memory rows: (a) at least two data, both of which correspond to one of the image rows, and (b) at least two image vector portions, a first one of the image vector portions including at least two data each corresponding to one of the image columns, and a second one of the image vector portions including at least two other data each corresponding to another of the image columns. In addition, preferably the at least two data of the first image vector portion and the at least two other data of the second image vector portion each respectively correspond to the same image rows.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

BRIEF DESCRIPTION OF THE DRAWINGS

FIG. 2 is a schematic diagram of a memory with the image data stored therein.

DETAILED DESCRIPTION

Figure 1:
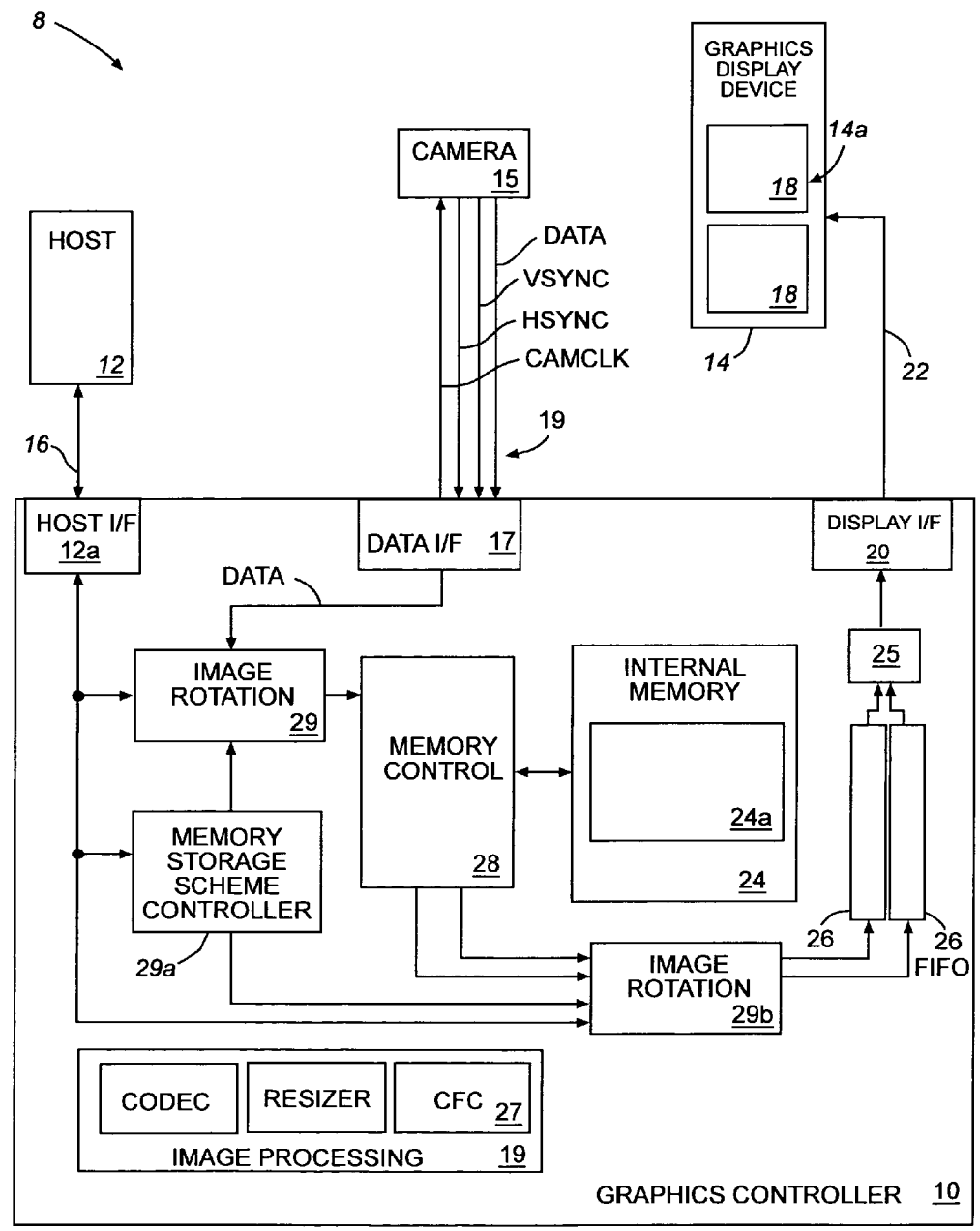
FIG. 1 is a block diagram of a graphics display system having a DRAM based graphics controller providing for efficient image manipulation according to a preferred embodiment of the present invention.

Preferred embodiments are directed to methods and apparatus for efficient rotation of an image in a graphics display system. In addition, methods and apparatus according to the invention are preferably implemented in a graphics controller. Reference will now be made in detail to specific preferred embodiments of the invention, examples of which are illustrated in the accompanying drawings. Wherever possible, the same reference numbers are used in the drawings and the description to refer to the same or like parts.

Graphics controllers, according to preferred embodiments, are preferably used in a graphics display system comprising at least one provider of image data, such as a host or a camera, and a graphics display device. Preferably, the graphics controller is a separate IC from the remaining elements of the system. The remaining elements are referred to in this document as being "remote" from the graphics controller.

Preferred graphics display controllers are advantageously used in portable digital appliances, such as mobile telephones, portable digital music players, and personal digital assistants. However, the principles of the invention may be employed in any system employing DRAM, SDRAM, or other memory in which it is more efficient to access a plurality of storage locations within a row than it is to access a like number of storage locations in different rows, because of the need for RAS and pre-charge cycles, or because of other considerations. Further, while specific, preferred embodiments of the invention are described in some detail in this document, there is no intent to suggest that the invention must be limited to this context unless otherwise expressly stated.

FIG. 1 shows a graphics display system 8 including a graphics controller 10 according to one preferred embodiment of the present invention. The system 8 may be any digital system or appliance. Where the system 8 is a portable digital appliance, it is typically powered by a battery (not shown). The system 8 typically includes a host 12 and a graphics display device 14, and one or more camera modules ("camera") 15. The graphics controller 10 interfaces the host and camera with the display device. The graphics controller is typically and preferably remote from the host, camera, and display device.

The host 12 is typically a microprocessor, but may be a digital signal processor, a computer, or any other type of controlling device adapted for controlling digital circuits. The host 12 communicates with the graphics controller 10 over a bus 16 to a host interface 12a in the graphics controller 10.

The display device 14 has one or more display panels 14a with corresponding display areas 18. The graphics controller includes a display device interface 20 for interfacing between the graphics controller and the display device over a display device bus 22. LCDs are typically used as display devices in mobile telephones, but any device(s) capable of rendering pixel data in visually perceivable form may be employed. The one or more display panels 14a are adapted for displaying pixel data on their display areas.

The pixel data correspond to image "frames." For example, a single image frame may have 64 lines of pixels, where each line contains 128 pixels. A frame generally corresponds to a single image viewed on the display device 14. The pixel data are typically streamed from the camera 15 in raster order. The pixel data of a particular row are grouped together so that all of the pixel data corresponding to a particular row are streamed before any pixel data corresponding to a subsequent row are streamed. Likewise, the pixel data of particular frames are grouped together so that all of the pixel data corresponding to a particular frame are streamed before any pixel data corresponding to a subsequent frame are streamed. Accordingly, rows and frames are received by the graphics controller 10 in a sequential order.

The graphics controller has a parallel "data" interface 17 for receiving pixel data output over DATA lines of a bus 19 from the camera 15 along with vertical and horizontal synchronizing signals ("VSYNC" and "HSYNC"). A camera clocking signal CAMCLK is provided to the camera by the graphics controller for clocking the pixel data out of the camera. The frames of pixel data are separated by the VSYNC signals.

A number of image processing operations may be performed on data provided by the camera 15. Such image processing operations are performed by an image processing units indicated generally as 19 in FIG. 1. The image processing module 19 may include, for particular illustration, a CODEC for compressing and decompressing image data, and a resizer for scaling and cropping the data.

In addition, the image processing module 19 may include a color format converter ("CFC") 27. In preferred embodiments, the pixel data are 24 bit sets of three 8-bit color components but may have any other range and may be limited to one or more of the components. In other preferred embodiments, the pixel data are 16 bits. The pixel data may be color or gray-scale. Color pixel data may be output from the camera 15 in YUV color format, where "Y" is a parameter relating to the luminance value of the data, and "U" and "V" are parameters relating to chrominance values of the pixel data. The YUV data are preferably converted in the graphics controller to a red-green-blue ("RGB") color format by the color format converter. In other embodiments, RGB data may converted to YUV by the CFC 27.

Image processing operations, such as cropping, scaling, compression encoding, and color converting, may be performed as the data are received from the camera, "on the fly," or they may be performed on data that have been stored in a memory.

In a preferred embodiment, the graphics controller includes an internal memory 24 for storing frames of image data. In other embodiments, however, the memory 24 may be remote from the graphics controller. Data are stored in and fetched from the internal memory 24 under control of a memory controller 28. The memory 24 is preferably a DRAM, an SDRAM, or other memory having operational characteristics such that accessing a plurality of storage locations within a single row is more efficient than accessing the same number of locations in different rows. It should be understood, however, that the principles of the invention may be employed for use with any type of memory.

Typically, the image data stored in the memory 24 are fetched and transmitted through a plurality of parallel "display pipes" 26, which are preferably FIFO buffers. The output of the display pipes 26 is passed through a selecting unit 25, for selecting data from one of the pipes 26. The image data is transmitted from the selecting unit 25 through a display device interface 20 and an output bus 22 to the graphics display device 14.

FIG. 2 shows the organization of an exemplary memory 24. The memory 24 comprises a rectangular arrangement of rows "R" and columns "C," and, in FIG. 2, an exemplary frame F occupies a portion of the memory. Specifically, the frame F occupies a matrix of eleven rows and nine columns in the memory 24. The matrix is populated with pixel data $P_{m,n}$, where m and n are numbers that respectively identify the row and column of a pixel in the frame F. The frame F is preferably arranged in raster order. The rows and columns of the memory 24 preferably map to particular rows and columns of a display device so that if the frame F is fetched and written to the display in raster order the frame F would appear as an image on the display.

The pixel data $P_{m,n}$ are preferably received by the graphics controller and written into the memory 24 in raster order, but this is not necessary. It is important to note, however, that once the data are stored in the memory in rows and columns, it is preferable to read as much of the data as possible from the same row before reading data from another row, since row changes require RAS and precharge cycles.

The pixel data $P_{m,n}$ presented to the graphics controller for storage in the memory 24, in one preferred context for the invention, are generated by the camera 15. In this and other similar contexts, because the resolution of the camera 15 is typically greater than that of the display device 14, more pixels may be stored in the memory 24 than can be displayed on a panel 14a of the display device. That is, a particular frame F may be wider, taller, or larger in both directions than the display panel. As one example, a display panel has a resolution of 640 pixel columns by 480 pixels rows, or 307,200 pixels, while the camera may produce frames that are 1 million pixels or larger. As a second example, the frame F is 9×11, as shown in FIG. 2, and the display panel is 4×7, as shown in FIG. 3.

Figure 3:
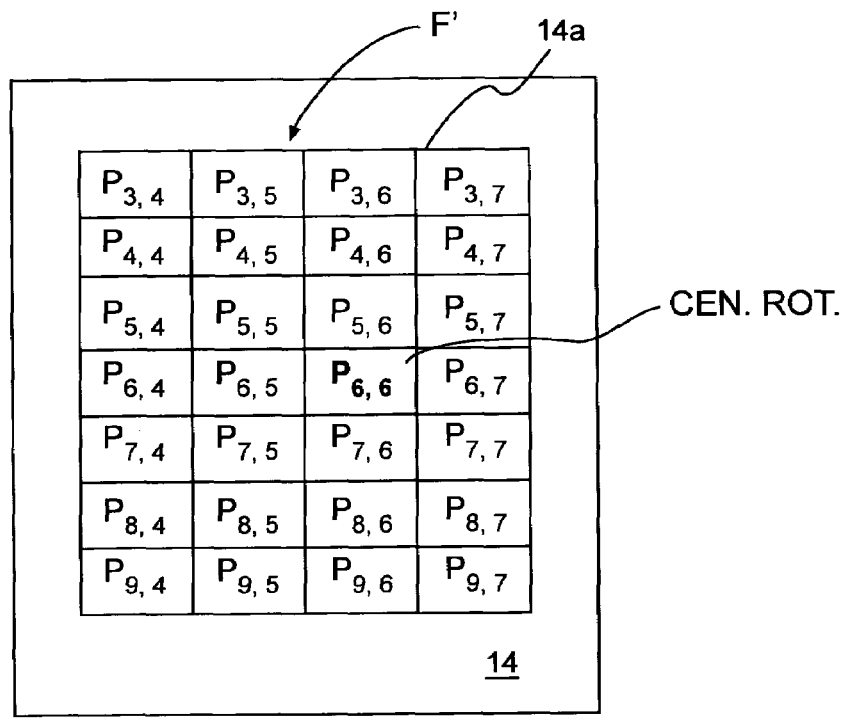
FIG. 3 is a schematic diagram of a display device of the system of FIG. 1 displaying an image.

Turning now to FIG. 3, the display device 14 displaying a portion of the frame F as an image is shown. Preferably, pixel data are fetched from the memory 24 and provided to the display device 14 in raster order. The display device 14 is adapted to accept the pixel data in this order and to display the pixel data in a raster order on the panel 14a.

FIG. 3 illustrates that the graphics controller is preferably adapted to resize the camera frame F by stripping pixel data from it, or scaling it. Resizing operations may be performed before, or after the frame F is stored in memory, but resizing should be performed before transmitting the frame to the display panel. Where cropping is performed after the frame is stored, the user may be able to "scroll" or "pan" the image on the display panel. When a frame is panned, the resizing operation causes some of the previously displayed pixel data not to be fetched, and other not previously displayed pixel data to be fetched.

Figure 4:
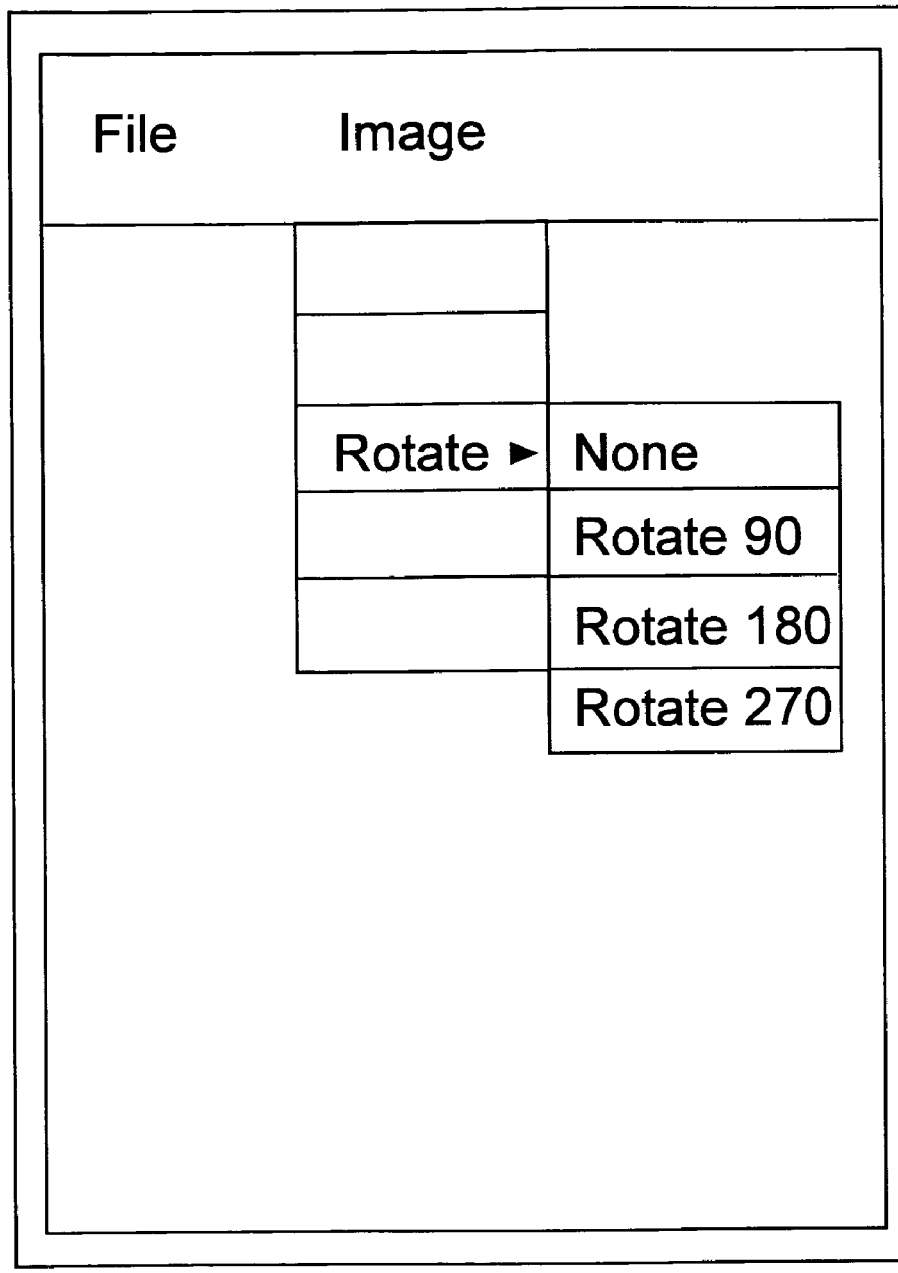
FIG. 4 is diagram of an exemplary user interface.

The graphics controller 10 may also provide for rotating the image. In FIG. 1, preferred units for performing frame rotation are indicated as image rotation modules 29, 29b. Any known user interface may be employed. For example, the user interface may select frame rotation from a menu using a keypad, a mouse, or trackball. Alternatively, the user interface may select frame rotation by pressing one or more switch icons on a touch-sensitive screen. Other types of user interface will be known to one skilled in the art. An exemplary menu-type user interface 32 is shown in FIG. 4. In any case, once the user has selected a command to cause image rotation, the command is preferably detected by the host 12, which sends appropriate commands to the image rotation units 29, 29b in the graphics controller over the host interface 12a.

In a portable digital appliance, the user typically may not be able to enter a specific angle of rotation or a desired center of rotation. Instead, the user may be provided with the choice of having the image rotated by a predetermined angle or not about the center of the display (or other predetermined center of rotation). However, persons of ordinary skill will readily appreciate that a more sophisticated user interface may be provided that permits the user to specify the angle of rotation and a desired center of rotation where that is desired.

To implement memory storage schemes according to the present invention, the graphics controller 10 preferably includes a memory storage scheme controller 29a. The memory storage scheme controller 29a may or may not be part of one or both of the image rotation modules 29, 29b. In one preferred embodiment, the controller 29a is adapted to provide only one memory storage scheme. In other embodiments, the controller 29a is adapted to provide more than one memory storage schemes. In these embodiments, the memory storage schemes are preferably selectable. For example, the memory storage scheme controller 29a may be programmable by the host 12. The host, for instance, may specify a particular storage scheme by writing a parameter to the controller 29a. In addition, the host preferably is able to specify when the controller 29a is to be employed. Further, whether the controller 29a is to be used, and if used, which storage scheme is to be employed may be specified either with or without user input, such as via the user interface 32. Preferably, a particular memory storage scheme is selected in advance of knowing whether the image being stored will in fact be rotated or not, as one goal is to increase average efficiency which will typically be based on estimating a percentage of rotated images.

The memory storage scheme controller 29a calculates and provides memory addresses to the image rotation modules 29, 29b. In a preferred embodiment, the storage scheme controller 29a specifies memory addresses to image rotation modules 29, 29b on a pixel-by-pixel basis. For image data presented for storage in the memory 24, the image data may be presented by the host 12, the camera 15, or other image data source, and is preferably presented in raster order. The storage scheme controller 29a specifies a memory address for a particular pixel datum based on the position of the datum in the presentation sequence, e.g. raster sequence. Accordingly, the height, width, and ordering scheme for the source image matrix are preferably provided to the storage scheme controller 29a for use in calculating addresses. Moreover, the controller 29a preferably specifies memory addresses to the image rotation module 29 in synchronicity with the presentation of pixel data to the memory. In addition, the controller 29a may, in other embodiments, specify memory addresses on other than a pixel-by-pixel basis. For instance, as color pixels are comprised of component datum, the controller 29a may specify a separate address for each of the components. Persons of ordinary skill will recognize that the functions of the storage scheme controller 29a may be a implemented in number of different ways. For example, the controller 29a may comprise hardware, software, or firmware, or a combination of one or more of these things.

In an alternative preferred embodiment, the memory storage scheme controller 29a and image rotation module 29b are employed for use with image data stored in memory. Preferably, the image data is stored in the memory in raster order. The memory storage scheme controller 29a is used to specify memory addresses to the image rotation module 29b for defining the sequence in which pixels are to be fetched from memory for presentation to the display device 14, the CODEC, or other image data destination.

While the embodiment shown in FIG. 1 includes both the image rotation modules 29 and 29b, other embodiments includes only one of the image rotation module 29 and 29b.

Figure 5:
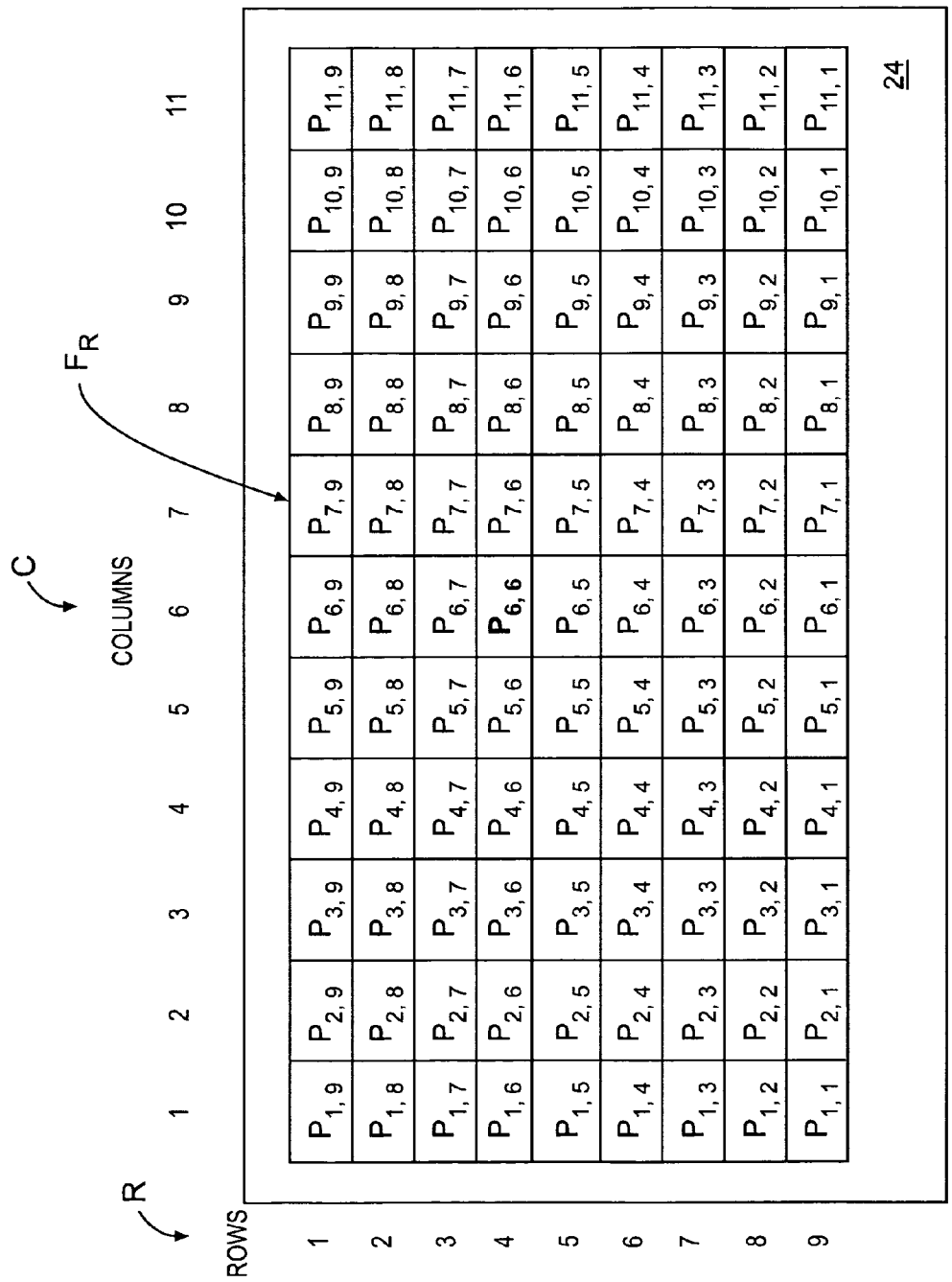
FIG. 5 is a schematic diagram of a memory with the image data of FIG. 2 rotated 90 degrees counterclockwise.

FIG. 5 illustrates another view of the exemplary memory 24 shown in FIG. 2. In FIG. 5, an exemplary frame $F_R$ occupies a portion of the memory. Specifically, the frame $F_R$ occupies a matrix of eleven columns and nine rows in the memory 24. The frame $F_R$ is a rotated version of the frame F shown in FIG. 2. The angle of rotation is –90 degrees, defining a 90 degree counterclockwise rotation. Comparing FIGS. 2 and 5, the frame $F_R$ has a greater width, but a shorter height than the frame F.

Figure 6:
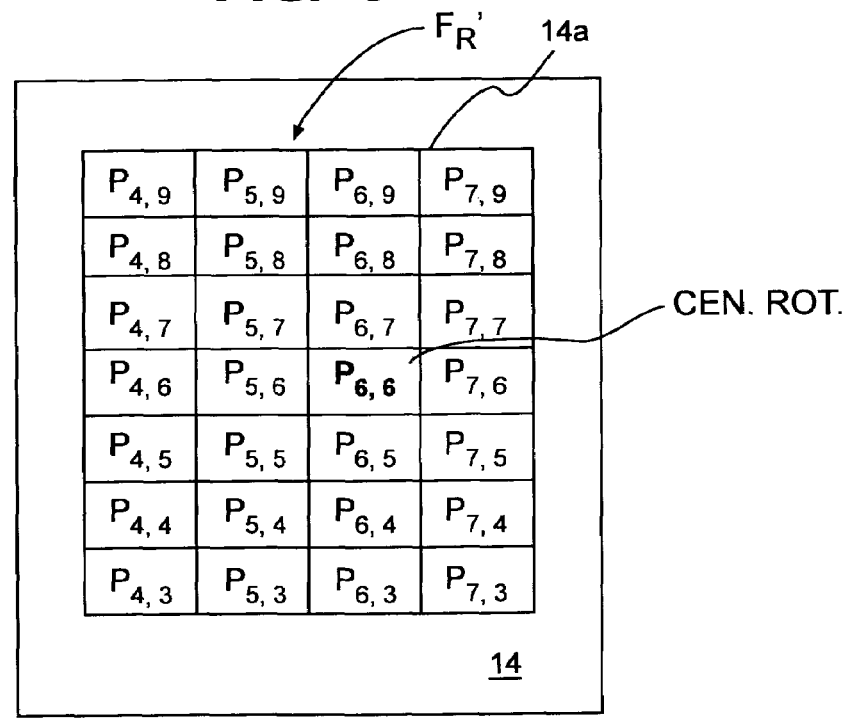
FIG. 6 is a schematic diagram of the display device of FIG. 3 with the image of FIG. 3 rotated 90 degrees counterclockwise.

Turning now to FIG. 6, the display device 14 is shown displaying a portion of the frame $F_R$ of FIG. 5. The image displayed in FIG. 6 is the result of a command to rotate the F' shown in FIG. 3 about a center of rotation ("CEN. ROT."), which in this example is the pixel datum $P_{6, 6}$.

A problem may result when rotating an image, which can be appreciated by considering two examples. First, refer again to FIG. 3, and consider the top row ($P_{3, 4}$, $P_{3, 5}$, $P_{3, 6}$, $P_{3, 7}$). All these pixels are displayed on one line of the image. Referring to FIG. 2, the row index m for all of these pixels in the image matrix is 3, i.e., all these pixels are stored in one line of the memory. Therefore, the pixels in FIG. 3 can be fetched on a row-by-row basis from the memory 24, minimizing the number of RAS and precharge cycles required of the memory 24. Accordingly, where an image is stored in the same order in which it will be fetched for display, memory access is at its highest efficiency.

As a contrasting example refer to the image of FIG. 6, and consider the pixels the top row ($P_{4, 9}$, $P_{5, 9}$, $P_{6, 9}$, $P_{7, 9}$). While all of these pixels are displayed on one line of the image, referring to FIG. 2, the row index m for each of these pixels in the image matrix is different, i.e., each pixel is stored in a different line of the memory. In order to fetch the pixels from the memory 24 shown in FIG. 2, each pixel must be fetched from a different row of the memory. For example, referring to FIGS. 2 and 6, $P_{4,9}$ must be fetched from row 4 of the memory, $P_{5,9}$ must be fetched from row 5, $P_{6,9}$ must be fetched from row 6, and $P_{7,9}$ must be fetched from row 7, and so on. Therefore, to fetch the image rendered in FIG. 6 in raster order from the memory 24 as shown in FIG. 2, RAS and precharge cycles are required for each pixel fetch. In other words, a maximum number of a RAS and precharge cycle are required. Accordingly, fetching the image rendered in FIG. 6 from the memory 24 for a 90 degree rotation results in a maximum of inefficiency.

If it is known in advance of storing a frame in memory that the frame is to be rotated for display, the pixel data can be stored in a rotated order as shown in FIG. 5, to bring the data into alignment with the image to be displayed. However, whether or not there is to be a rotation is often not known in advance. Further, the same image may be viewed twice, once as a rotated image and once as a non-rotated image.

Preferred embodiments of the invention are directed to contexts where it is not known in advance of storing whether a frame will be rotated for display. Further, preferred embodiments are directed to contexts where it may be desired to fetch the same frame from memory for display more than once, where at least one of the frame fetches is for a non-rotated display and at least one of the frame fetches is for a rotated display.

According to preferred embodiments, pixel data received by the graphics controller 10 over either the interface 12a or the interface 17 of FIG. 1 are stored in the memory 24 in a particular arrangement. The novel arrangements ensure that at least two pixel datum may be fetched for display from each of the rows of the memory, regardless of whether the data are fetched for displaying a non-rotated image or a rotated image. In this way, at least two pixels will always be fetched for each of the RAS and precharge cycles.

Figure 7:
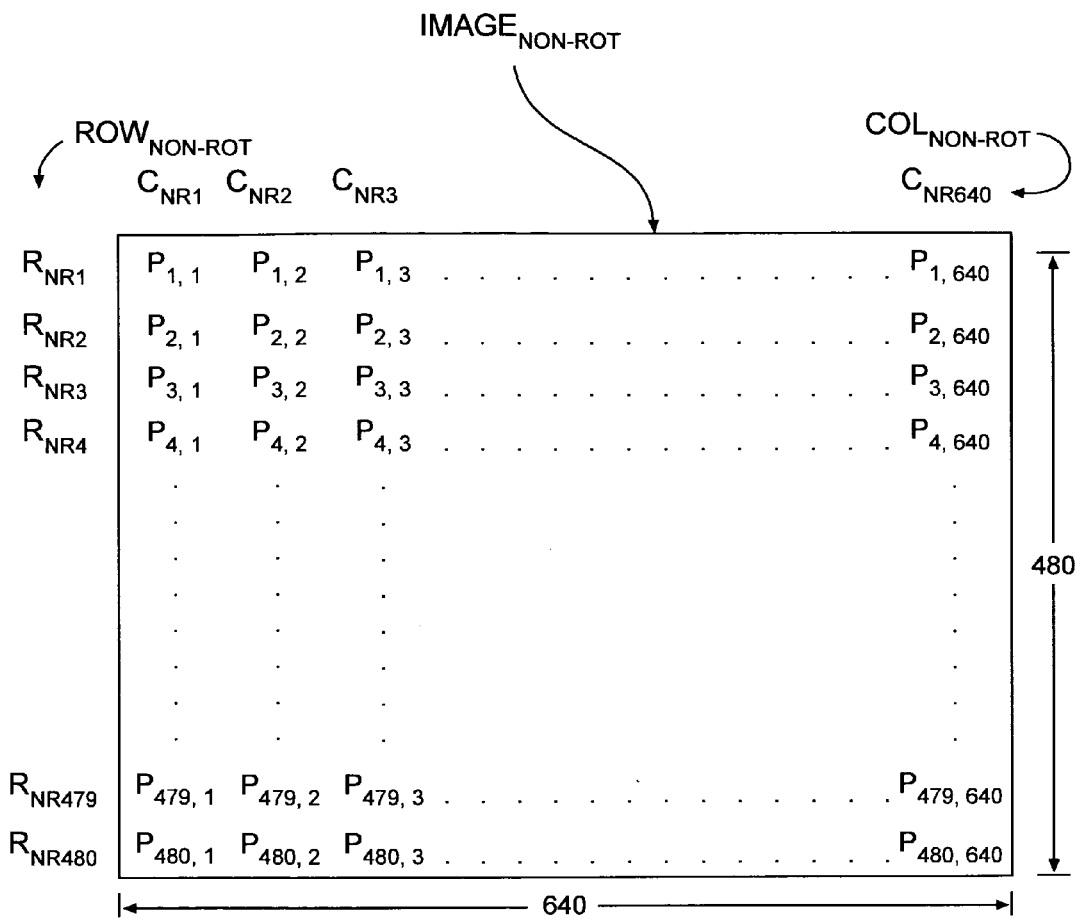
FIG. 7 is a conceptual diagram of an image matrix corresponding to pixels displayed in ordinary raster order.
Figure 8:
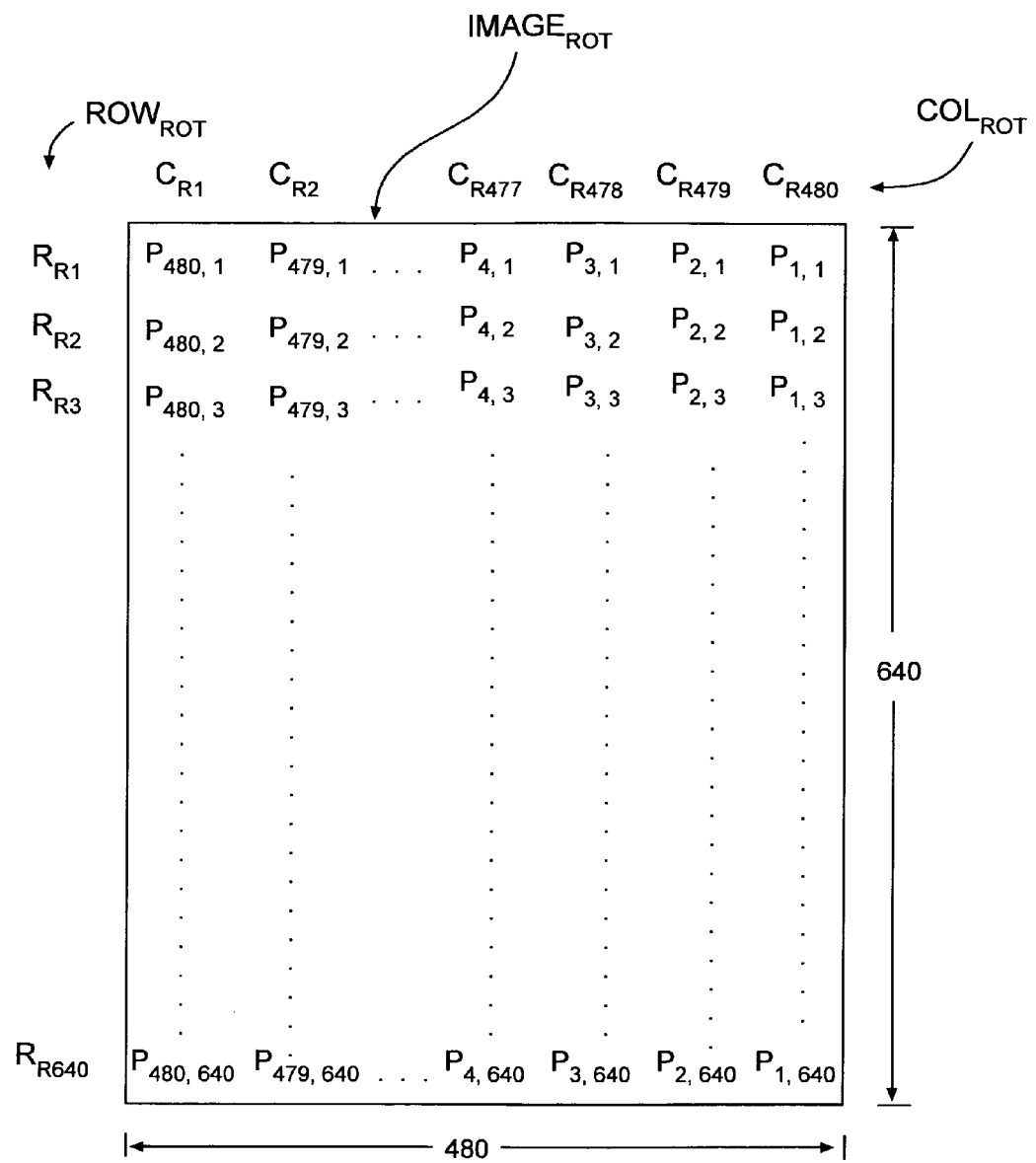
FIG. 8 is a conceptual diagram of an image matrix corresponding to that of FIG. 7 except rotated 90 degrees clockwise.
Figure 9:
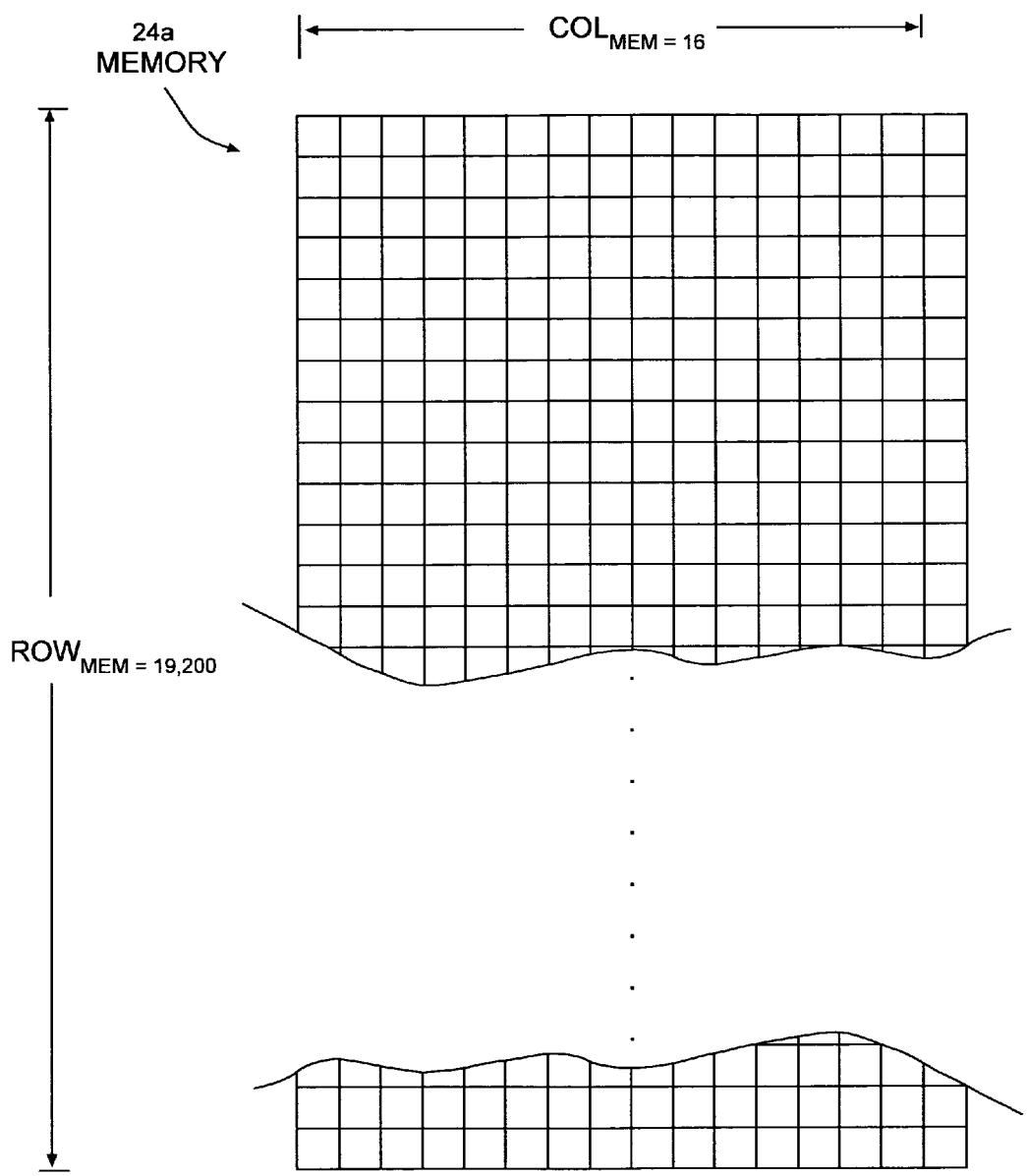
FIG. 9 is a schematic diagram of a portion of a memory of the graphics controller of FIG. 1 according to one preferred embodiment.

Before describing preferred arrangements of pixels in a memory according to the invention, exemplary non-rotated and rotated image matrices, as well as another exemplary memory 24, which are referred to in the description of the preferred arrangements, are first presented with reference to FIGS. 7, 8, and 9.

FIG. 7 shows an exemplary "image matrix" $IMAGE_{NON-ROT}$ that corresponds to pixels $P_{m,n}$ arranged in raster order such as in the order received from the camera 15 and which therefore defines an image that is not rotated. The matrix $IMAGE_{NON-ROT}$ is 640 pixels wide×480 pixels, and therefore has 480 rows $ROW_{NON-ROT}$ and 640 columns $COL_{NON-ROT}$.

FIG. 8, in contrast to FIG. 7, shows an image matrix $IMAGE_{ROT}$ having the same pixels as those shown in FIG. 7, but arranged such that the image appears rotated +90 degrees (90 degrees clockwise). The matrix $IMAGE_{ROT}$ is 480 pixels wide by 640 pixels, and therefore has 640 rows $ROW_{ROT}$ and 480 columns $COL_{ROT}$. For a 90 degree clockwise rotation, the 640 rows ($ROW_{ROT}$) of FIG. 8 are equivalent to the 640 columns ($COL_{NON-ROT}$) of FIG. 7 except that the pixels $P_{M,N}$ are arrayed in reverse order. In addition, the 480 columns of FIG. 8 ($COL_{ROT}$) are fully equivalent to the 480 rows ($ROW_{NON-ROT}$) of FIG. 7.

FIG. 9 shows a portion 24a of the memory 24 according to a preferred embodiment in which the memory 24 is 256 bits wide for storing sixteen 16-bit pixels. In the shown embodiment, the portion 24a of the memory 24 is employed for storing [480·640]/16=19,200 pixels, in 16 columns comprises 16 columns $COL_{MEM}$ and 19,200 rows $ROW_{MEM}$. The width of the memory portion 24a corresponds to a "page" in the shown embodiment of the memory 24. The pixels within a page may be read with a single pair of RAS and precharge cycles, preferably in burst mode. While the memory 24 shown in FIG. 9 is referred to below for purposes of illustration, it should be understood that the invention is not limited to this exemplary memory. For instance, in a preferred embodiment, the memory 24 is 128 bits wide. In addition, the 128 bits wide memory is preferably employed for storing 24 bpp image data, such that each line contains 5.33 pixels.

Figure 10:
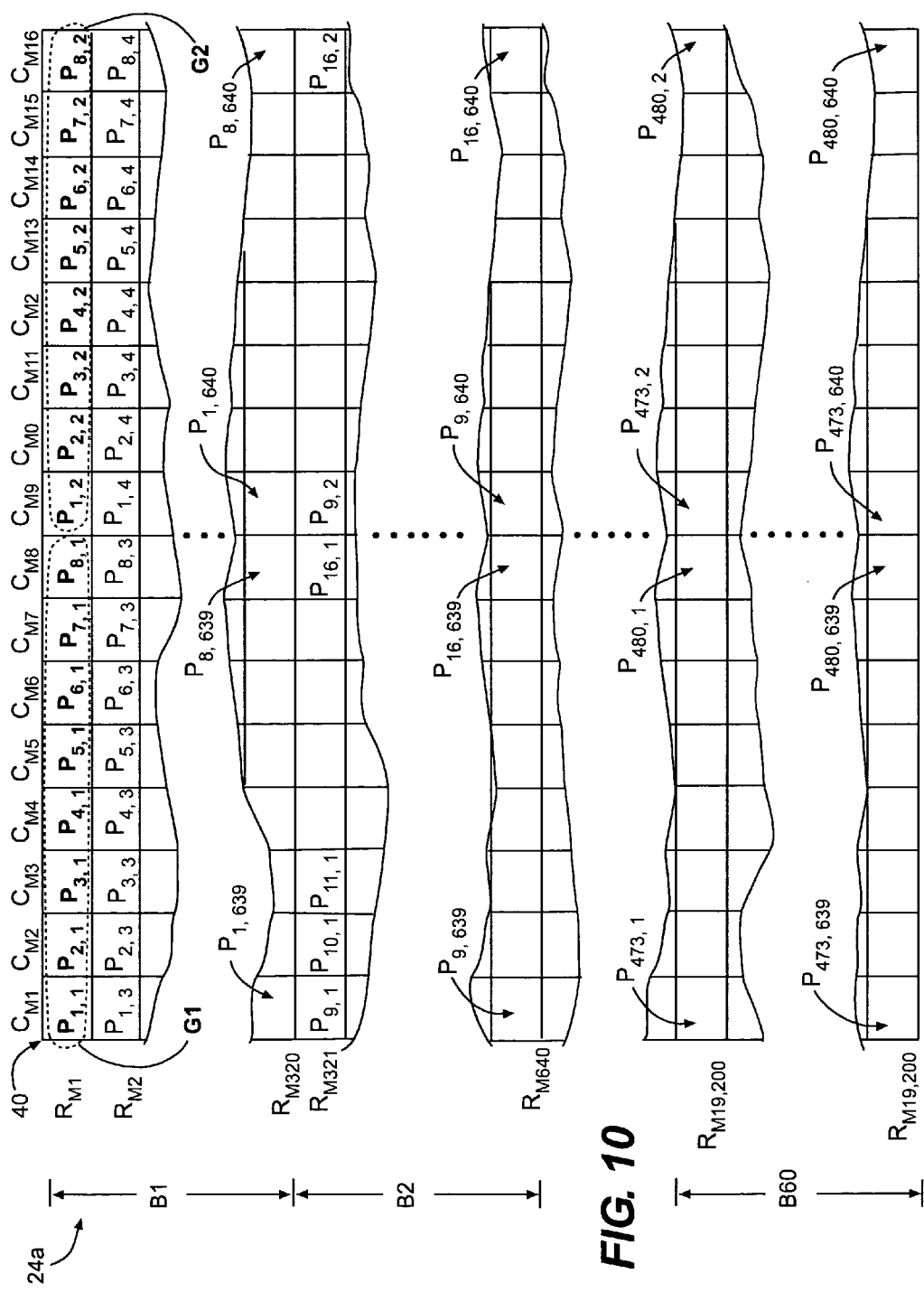
FIG. 10 is a schematic diagram of the memory of FIG. 9 organized according to a first exemplary memory storage scheme according to a preferred embodiment of the present invention.
Figure 11:
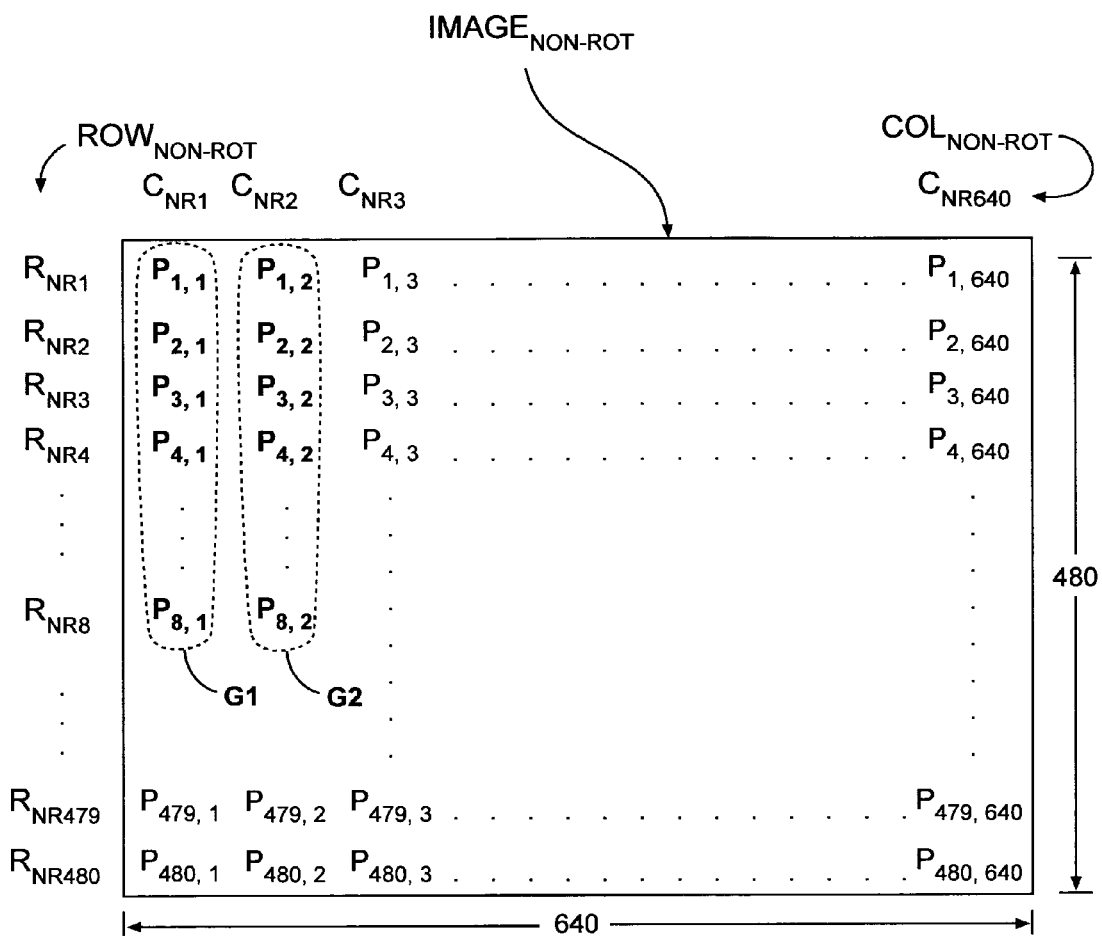
FIG. 11 is a schematic diagram showing the image matrix of FIG. 5 with pixels grouped according to the memory storage scheme of FIG. 10.

FIG. 10 shows an exemplary memory storage scheme 40 according to one preferred embodiment of the invention. The memory portion 24a is shown with pixels $P_{m,n}$ stored therein according to scheme 40. FIG. 11 illustrates how pixels are mapped into memory 24a from a non-rotated image matrix according to scheme 40. In FIG. 10, the pixels $P_{m,n}$ comprise 60 blocks BK. The blocks B1-B60 represent blocks of pixels $P_{m,n}$ for which the row index m ranges respectively from 1-8, 9-16, . . . , 473-480, the column index n ranging from 1-640 in each block. Each block comprises 320 rows of the memory portion 24a. Group G1 designates an 8-pixel portion comprising pixels $P_{1,1}$, $P_{2,1}$, $P_{3,1}$, $P_{4,1}$, $P_{5,1}$, $P_{6,1}$, $P_{7,1}$, and $P_{8,1}$. G2 designates another 8-pixel portion comprising pixels $P_{1,2}$, $P_{2,2}$, $P_{3,2}$, $P_{4,2}$, $P_{5,2}$, $P_{6,2}$, $P_{7,2}$, and $P_{8,2}$.

FIG. 11 shows the non-rotated image matrix of FIG. 7 with pixels groups G1 and G2 according to the scheme 40 highlighted. Comparing FIGS. 10 and 11, it can be seen that, according to the exemplary scheme 40, 2 groups (A=2) of 8 pixel portions (B=8) of image columns $C_{NON-ROT}$ ("image columns") of the image matrix $IMAGE_{NON-ROT}$ are stored in the same memory row $R_M$ ("memory rows") of the memory portion 24a. For example, the groups G1 and G2 represent corresponding 8-pixel portions of image columns $C_{NR1}$ and $C_{NR2}$, defined by the eight rows ("image rows") $R_{NR1}$-$R_{NR8}$ of the image matrix $IMAGE_{NON-ROT}$. Both groups G1 and G2 are stored in and occupy the first memory row $R_{M1}$, e.g., the group G1 occupies the first eight columns $C_{M1}$-$C_{M8}$ ("memory columns") of the memory portion 24a. The remaining image columns and image rows are treated similarly.

If the image is to be displayed without rotation, then as a result of using the memory storage scheme 40, 2 pixels (A=2) that are in the same image row $ROW_{NON-ROT}$ (FIG. 11) of the non-rotated image matrix $IMAGE_{NON-ROT}$ will also be in the same memory row $R_M$. Therefore, these 2 pixels can be read without requiring a page change in the memory portion 24a. For example, in the first image row $R_{NR1}$ the two pixels $P_{1,1}$ and $P_{1,2}$ are both located in the same memory row $R_{M1}$ and can be read together without a page change.

On the other hand, if the image is to be rotated for display, 8 pixels (B=8) that are in the same row $R_R$ of the rotated image matrix $IMAGE_{ROT}$ (FIG. 8) will also be in the same memory row $R_M$ and can be read without requiring a page change. For example, the first memory row $R_{M1}$, includes pixels $P_{1,1}$; $P_{2,1}$; $P_{3,1}$; . . . ; $P_{8,1}$, all of which are located in the first image row $R_{R1}$ of the rotated image matrix $IMAGE_{ROT}$.

Compare the memory organization scheme 40 with a raster order memory organization, i.e., the order shown in the non-rotated image matrix $IMAGE_{NON-ROT}$ of FIG. 7. If the image to be displayed without rotation, then as a result of using raster memory storage scheme, no pages would be crossed and therefore all $C_M$=16 pixels in a given row of the memory portion 24a could be read together with only one set of RAS and precharge cycles or page change. However, if the image is to be rotated for display, every single pixel in a row of the image would need to be obtained from a different row of the memory portion 24a, requiring fifteen additional page changes.

Figure 12:
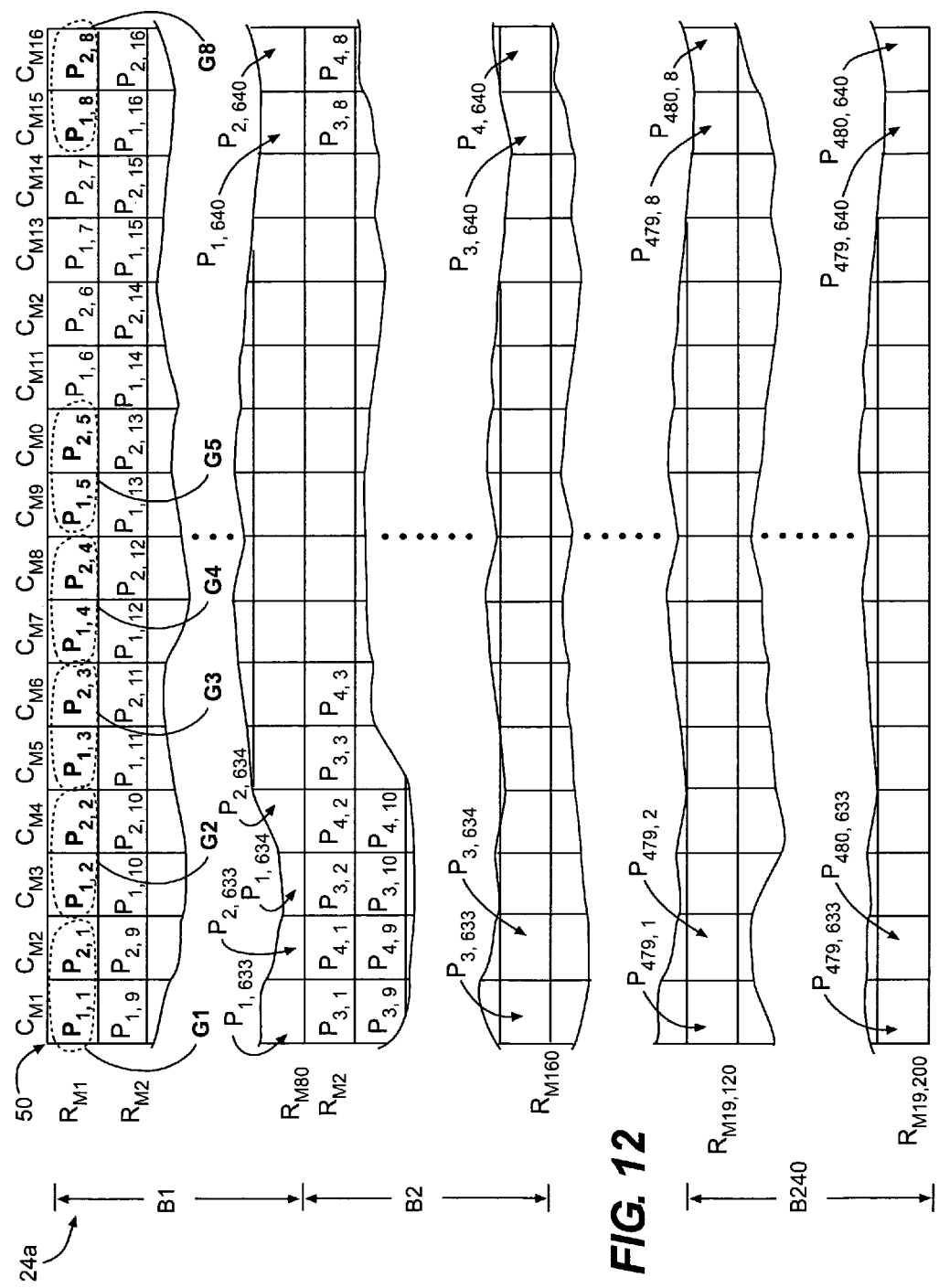
FIG. 12 is a schematic diagram of the memory of FIG. 9 organized according to a second exemplary memory storage scheme according to a preferred embodiment of the present invention.
Figure 13:
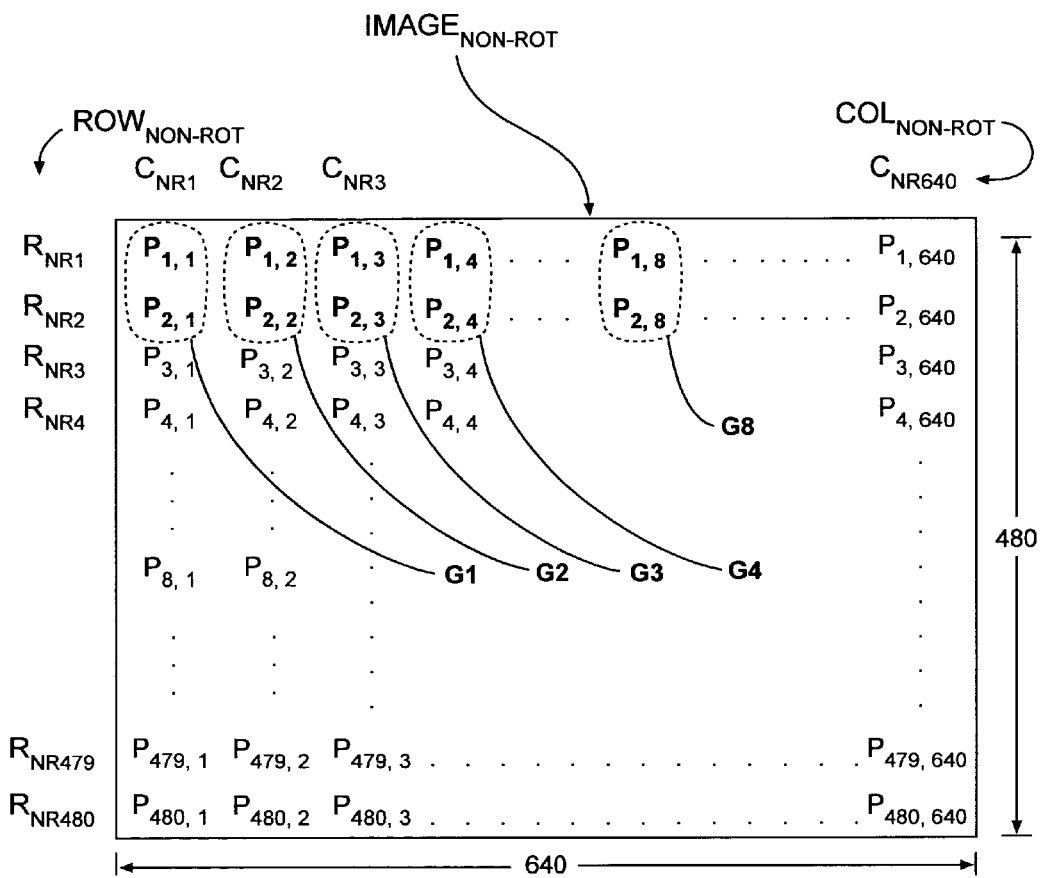
FIG. 13 is a schematic diagram showing the image matrix of FIG. 5 with pixels grouped according to the memory storage scheme of FIG. 12.

FIG. 12 shows an exemplary memory storage scheme 50 according to another preferred embodiment of the invention. The memory portion 24a is shown with pixels $P_{m,n}$ stored therein according to scheme 50. FIG. 13 illustrates how pixels are mapped into memory 24a from a non-rotated image matrix according to scheme 50. In FIG. 12, the pixels $P_{m,n}$ comprise 240 blocks BK. The blocks B1-B240 represent blocks of pixels $P_{m,n}$ for which the row index m ranges respectively from 1-2, 3-4, ... 479-480, the column index n ranging from 1-640 in each block. Each block comprises 80 rows of the memory portion 24a. Group G1 designates a 2-pixel portion comprising pixels $P_{1,1}$, $P_{2,1}$. Group G2 designates a 2-pixel portion comprising pixels $P_{1,2}$, $P_{2,2}$. Group G3 designates a 2-pixel portion comprising pixels $P_{1,3}$, $P_{2,3}$. Group G4 designates a 2-pixel portion comprising pixels $P_{1,4}$, $P_{2,4}$. Group G5 designates a 2-pixel portion comprising pixels $P_{1,5}$, $P_{2,5}$. Group G8 designates a 2-pixel portion comprising pixels $P_{1,8}$, $P_{2,8}$.

FIG. 13 shows the non-rotated image matrix of FIG. 7 with pixels grouped according to the scheme 50. Comparing FIGS. 12 and 13, it can be seen that, according to the exemplary scheme 50, 8 groups (A=8) of 2 pixel portions (B=2) of image columns $C_{NR}$ are stored in the same memory row $R_M$. For example, groups G1-G8 represent corresponding 2-pixel portions of image columns $C_{NR1}$-$C_{NR8}$, defined by the two image rows $R_{NR1}$ and $R_{NR2}$. The eight groups G1-G8 are stored in and occupy the first memory row $R_{M1}$, e.g., the group G1 occupies the first two memory columns $C_{M1}$ and $C_{M2}$. The remaining image columns and image rows are treated similarly.

If the image is to be displayed without rotation, then as a result of using the memory storage scheme 50, 8 pixels (A=8) that are in the same row $ROW_{NON-ROT}$ of the non-rotated image matrix $IMAGE_{NON-ROT}$ (FIG. 13) will also be in the same memory row $R_M$. Therefore, these 8 pixels can be read without requiring a page change in the memory portion 24a. For example, in the first image row $R_{NR1}$, the eight pixels $P_{1,1}$; $P_{1,2}$; $P_{1,3}$; $P_{1,4}$; $P_{1,5}$; $P_{1,6}$; $P_{1,7}$; and $P_{1,8}$ are all located in the same memory row $R_{M1}$ and can be read together without a page change.

On the other hand, if the image is to be rotated for display, 2 pixels (B=2) that are in the same row $R_R$ of the rotated image matrix $IMAGE_{ROT}$ (FIG. 8) will also be in the same memory row $R_M$ and can be read without requiring a page change. For example, the first memory row $R_{M1}$ includes pixels $P_{1,1}$ and $P_{2,1}$, both of which are located in the first image row $R_{R1}$ of the rotated image matrix $IMAGE_{ROT}$. Therefore, to obtain a row of pixels for display using the memory organization scheme 50, the rotated image requires only seven page changes, and the non-rotated image requires only one page change.

Figure 14:
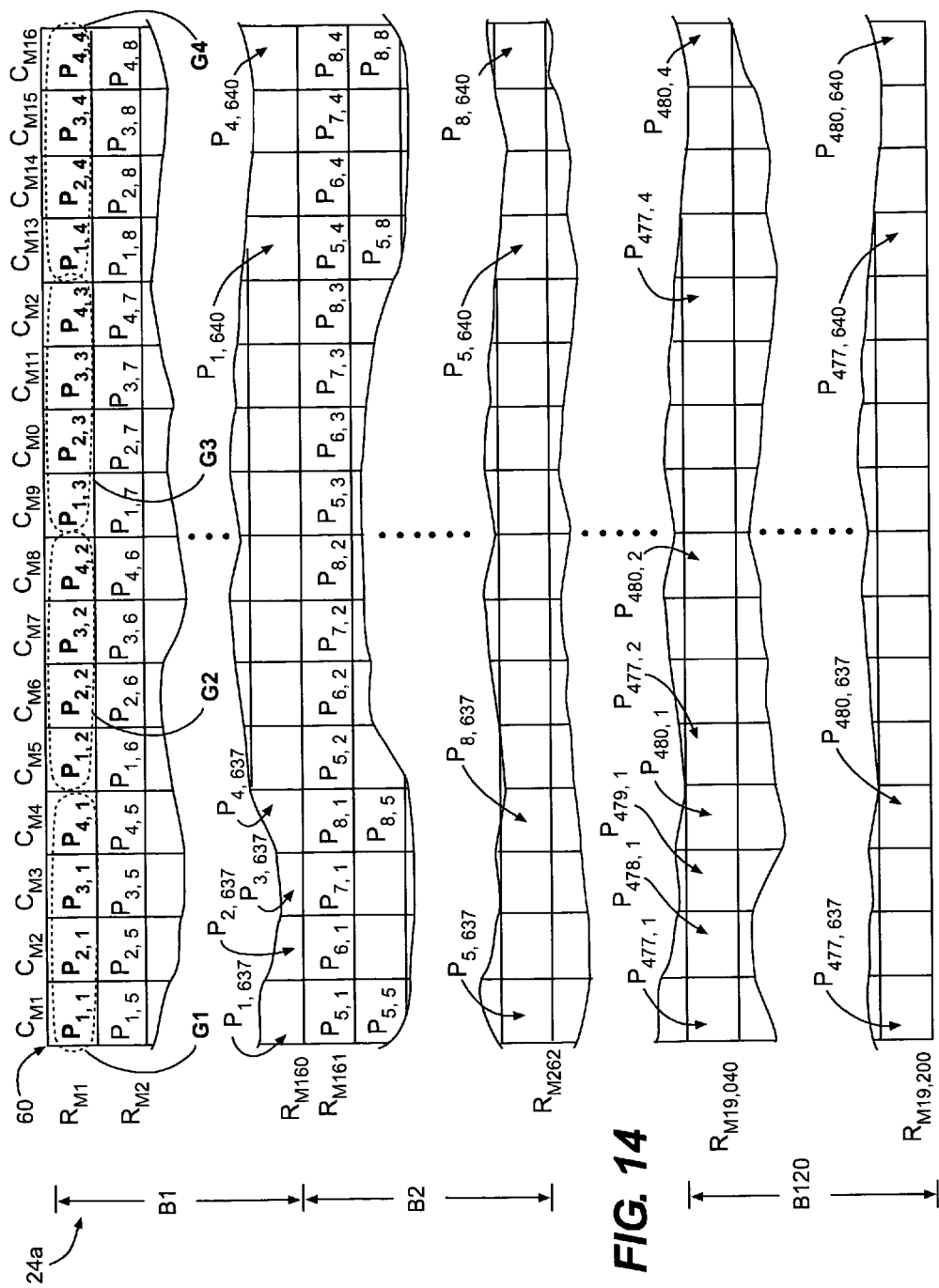
FIG. 14 is a schematic diagram of the memory of FIG. 9 organized according to a third exemplary memory storage scheme according to a preferred embodiment of the present invention.
Figure 15:
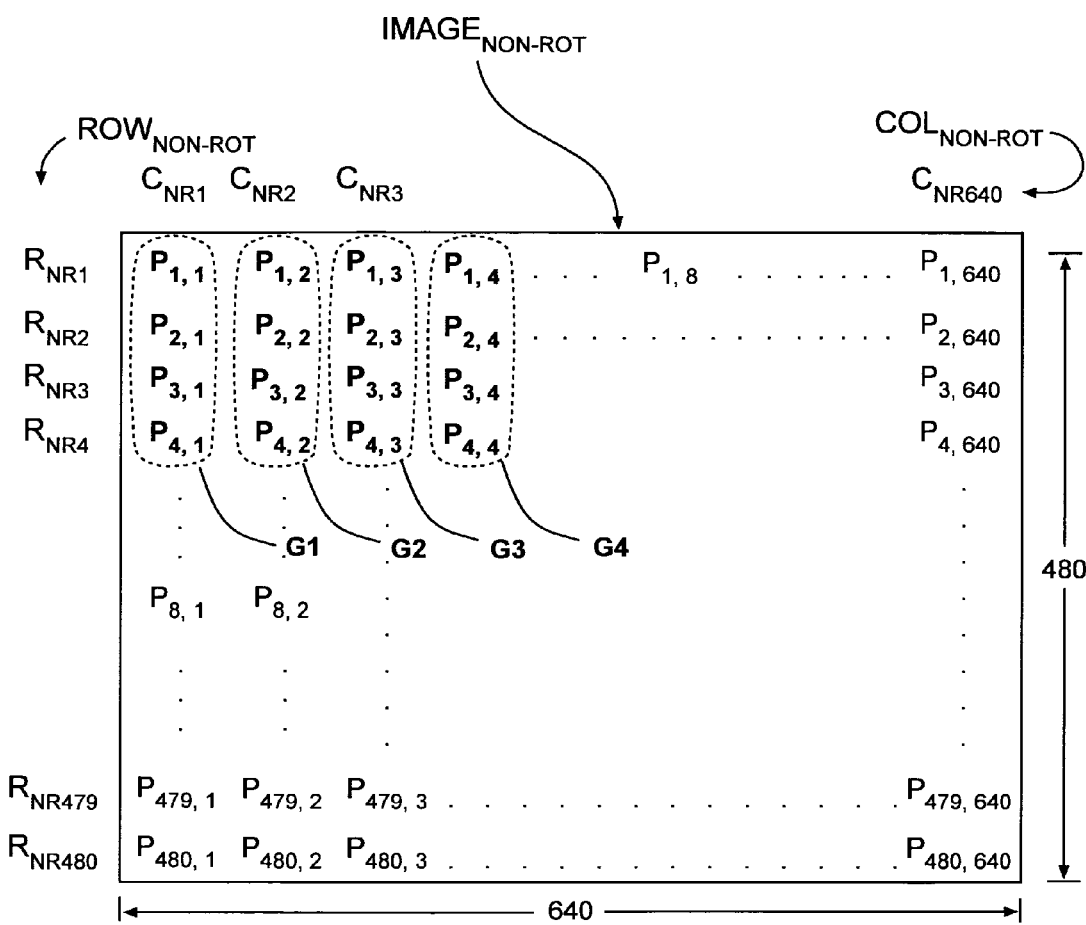
FIG. 15 is a schematic diagram showing the image matrix of FIG. 5 with pixels grouped according to the memory storage scheme of FIG. 14.

FIG. 14 shows an exemplary memory storage scheme 60 according to yet another preferred embodiment of the invention. The memory portion 24a is shown with pixels $P_{m,n}$ stored therein according to scheme 60. FIG. 15 illustrates how pixels are mapped into memory 24a from a non-rotated image matrix according to scheme 60. In FIG. 14, the pixels $P_{m,n}$ comprise 120 blocks BK. The blocks B1-B120 represent blocks of pixels $P_{m,n}$ for which the row index m ranges respectively from 1-4, 5-8, ... 477-480, the column index n ranging from 1-640 in each block. Each block comprises 160 rows of the memory portion 24a. Group G1 designates a 4-pixel portion comprising pixels $P_{1,1}$, $P_{2,1}$, $P_{3,1}$, $P_{4,1}$. G2 designates a 4-pixel portion comprising pixels $P_{1,2}$, $P_{2,2}$, $P_{3,2}$, $P_{4,2}$. Group G3 designates a 4-pixel portion comprising pixels $P_{1,3}$, $P_{2,3}$, $P_{3,3}$, $P_{4,3}$. G4 designates another a 4-pixel portion comprising pixels $P_{1,4}$, $P_{2,4}$, $P_{3,4}$, $P_{4,4}$.

FIG. 15 shows the non-rotated image matrix of FIG. 7 with pixels grouped according to the scheme 60. Comparing FIGS. 14 and 15, it can be seen that, according to the example scheme 60, 4 groups (A=4) of 4 pixel portions (B=4) of image columns $C_{NR}$ are stored in the same memory row $R_M$. For example, groups G1-G4 represent corresponding 4-pixel portions of image columns $C_{NR1}$-$C_{NR4}$, defined by the four image rows $R_{NR1}$-$R_{NR4}$. The four groups G1-G4 are stored in and occupy the first memory row $R_{M1}$, e.g., the group G1 occupies the first four memory columns $C_{M1}$-$C_{M4}$. The remaining image columns and image rows are treated similarly.

If the image is to be displayed without rotation, then as a result of using the memory storage scheme 60, 4 pixels (A=4) that are in the same row $ROW_{NON-ROT}$ of the non-rotated image matrix $IMAGE_{NON-ROT}$ (FIG. 15) will also be in the same memory row $R_M$. Therefore, these 4 pixels can be read without requiring a page change in the memory portion 24a. For example, in the first image row $R_{NR1}$, the 4 pixels $P_{1,1}$; $P_{1,2}$; $P_{1,3}$; and $P_{1,4}$ are all located in the same memory row $R_{M1}$ and can be read together without a page change.

On the other hand, if the image is to be rotated for display, 4 pixels (B=4) that are in the same row $R_R$ of the rotated image matrix $IMAGE_{ROT}$ (FIG. 8) will also be in the same memory row $R_M$ and can be read without requiring a page change. For example, the first memory row $R_{M1}$ includes pixels $P_{1,1}$; $P_{2,1}$; $P_{3,1}$; and $P_{4,1}$, all of which are located in the first image row $R_{R1}$ of the rotated image matrix $IMAGE_{ROT}$. Therefore, using the memory organization scheme 60, both the rotated and non-rotated images require only three page changes to obtain a row of pixels for display.

It may be appreciated that, while allowing for an improvement in efficiency when images are to be rotated at least some of the time, the scheme 40 provides high efficiency for rotation, the scheme 50 provides high efficiency for non-rotation, and the scheme 60 splits the difference. In these examples, A and B are integer values that satisfy A·B=$C_M$, which provide groups of image column portions $C_{NR}$ that divide a row of the memory portion 24a evenly. That is, in the scheme 40, A=2 groups of B=8-pixel portions of image columns $C_{NR}$ fit evenly into one row or page of the memory portion 24a. In the scheme 50, A=8 groups of B=2-pixel portions of the image columns fit one memory row; and in the scheme 60, A=4 groups of B=4-pixel portions of the image columns fit into one memory row. However, this is not essential.

Preferably, the number of pixels includes in the vertical and horizontal groups are powers of 2. Keeping the numbers to powers of 2 simplifies pixel address calculation logic. However, while keeping the numbers to powers of 2 is preferred, it too it not essential.

Figure 16:
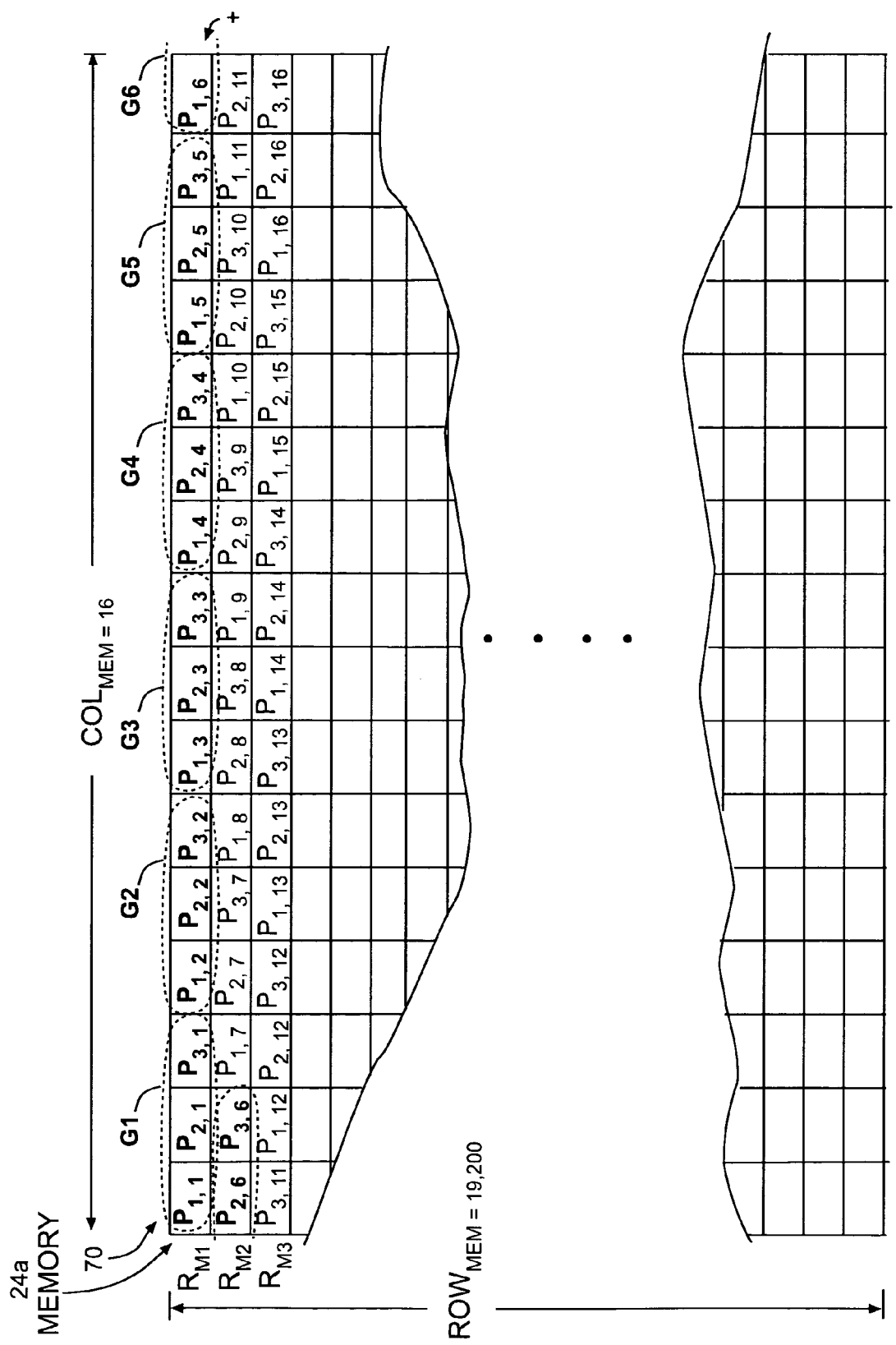
FIG. 16 is a schematic diagram of the memory of FIG. 9 organized according to a fourth exemplary memory storage scheme according to a preferred embodiment of the present invention.
Figure 17:
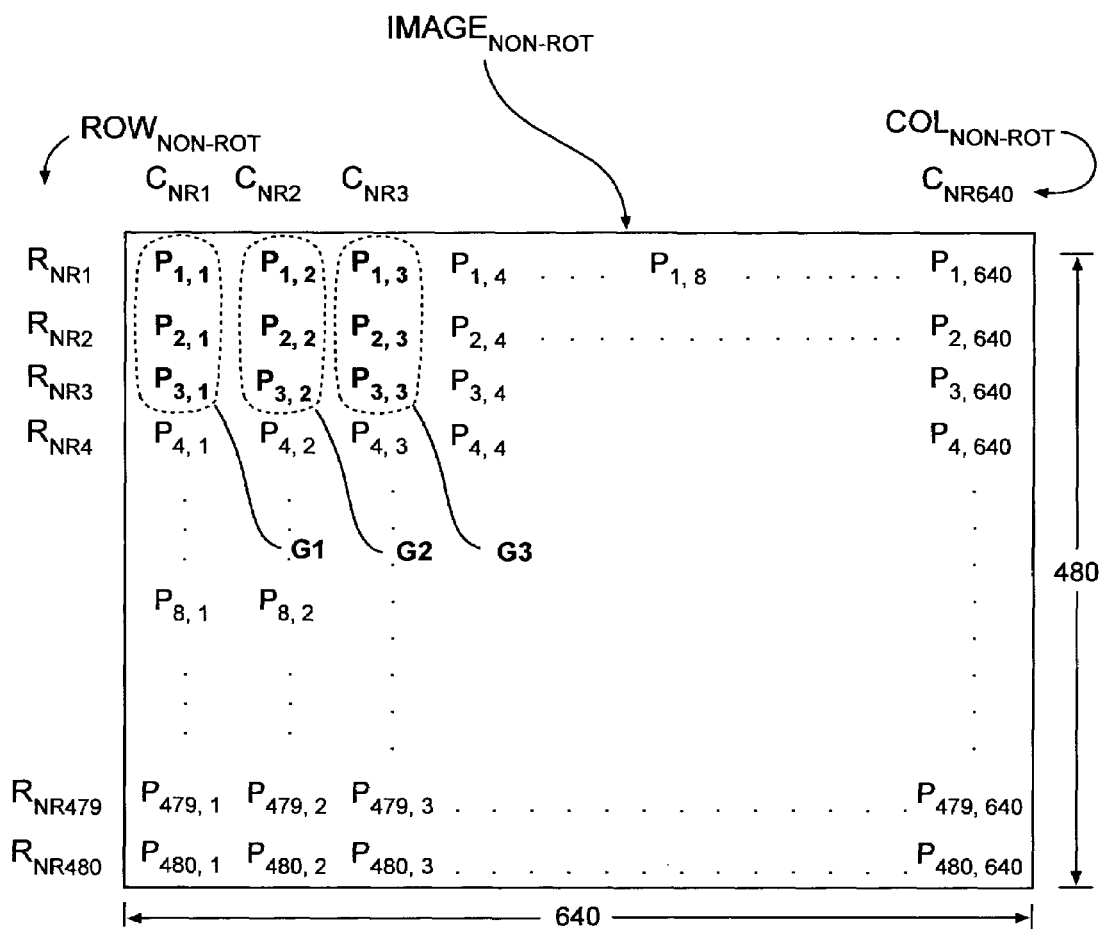
FIG. 17 is a schematic diagram showing the image matrix of FIG. 5 with pixels grouped according to the memory storage scheme of FIG. 16.

FIG. 16 shows an exemplary memory storage scheme 70 according to another preferred embodiment of the invention. The memory portion 24a is shown with pixels $P_{m,n}$ stored therein according to scheme 70. FIG. 17 illustrates how pixels are mapped into memory 24a from a non-rotated image matrix according to scheme 70. In FIG. 16, 5⅓ groups (A=5⅓) of 3-pixel portions (B=3) of image columns $C_{NR}$. For example, the group G1 designates the 3-pixel portion $P_{1,1}$, $P_{2,1}$, $P_{3,1}$ from the image column $C_{NR1}$. The group G2 designates the 3-pixel portion $P_{1,2}$, $P_{2,2}$, $P_{3,2}$ from the image column $C_{NR2}$. The group G3 designates the 3-pixel portion $P_{1,3}$, $P_{2,3}$, $P_{3,3}$ from the image column $C_{NR3}$. Further, the group G6+ designates a 1-pixel portion $P_{1,6}$ from the image column $C_{NR6}$.

The 5⅓ groups require three of the sixteen-pixel memory rows $R_M$, e.g., $R_{M1}$, $R_{M2}$, and $R_{M3}$, to accept an non-integer number (3·5⅓=16) of the groups. Nevertheless, pixels $P_{1,1}$; $P_{1,2}$; $P_{1,3}$; $P_{1,5}$; and $P_{1,6}$ in the first memory row $R_{M1}$ (FIG. 16) are present in a single image row $R_{NR1}$ of the non-rotated image (FIG. 17), while three pixels $P_{1,1}$ and $P_{2,1}$, and $P_{3,1}$ are present in a single image row $R_{R1}$ of the rotated image IMAGE$_{ROT}$ (FIG. 8). Hence, it is not essential that the groups bear an integral relationship with one row, and as should now be apparent, it is not essential that the groups bear an integral relationship with any number of rows and it is not essential that the blocks BK be regular or rectangular as in the exemplary memory storage schemes 40, 50, and 60.

It is also not essential that the portions of the image columns $C_{NR}$ that map into a single memory row correspond to precisely to the same B image rows $R_{NR}$ as shown in the above examples; however, there must be some overlap. This can be appreciated by comparison of FIGS. 18 and 19.

Figure 18:
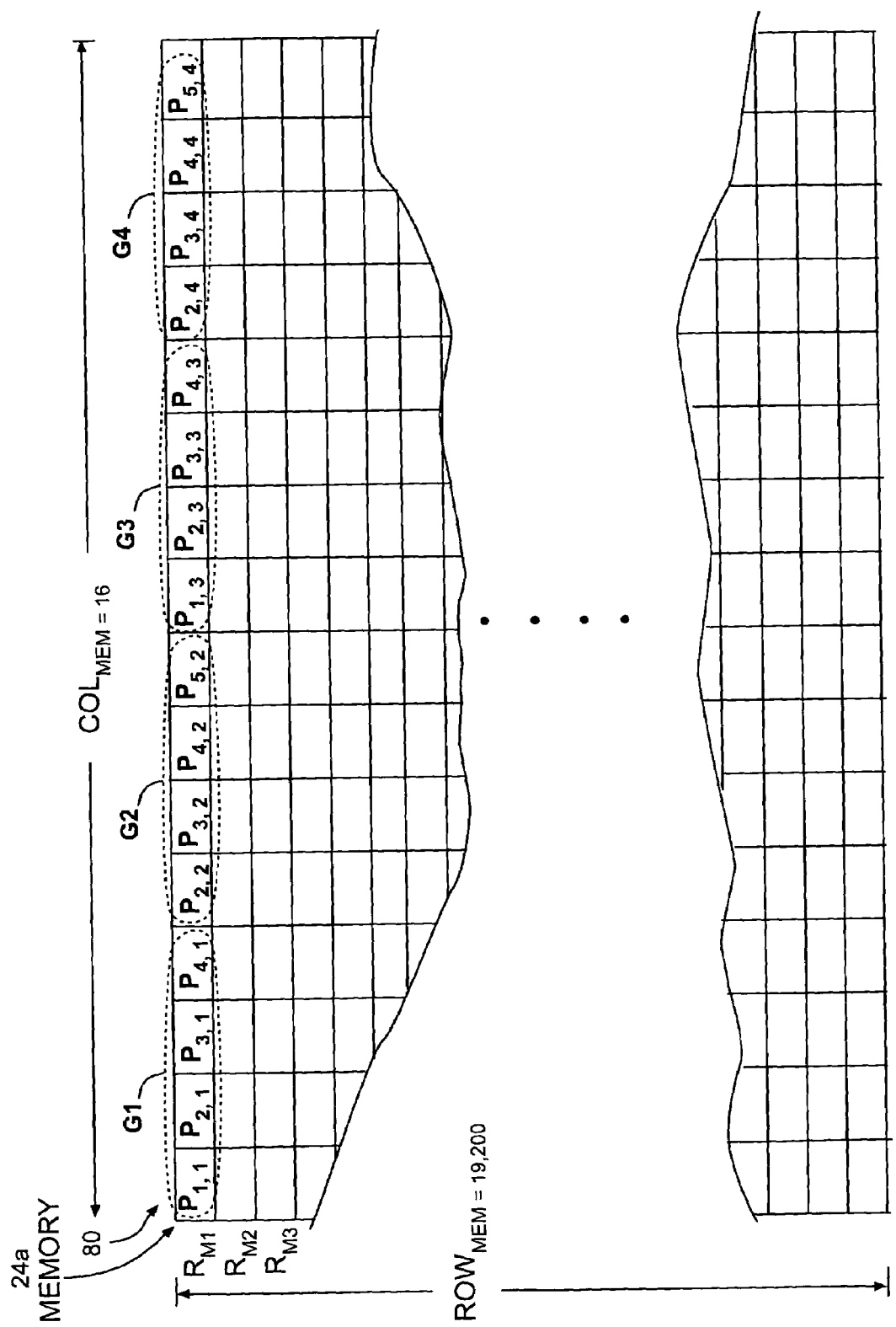
FIG. 18 is a schematic diagram of the memory of FIG. 9 organized according to a fifth exemplary memory storage scheme according to a preferred embodiment of the present invention.
Figure 19:
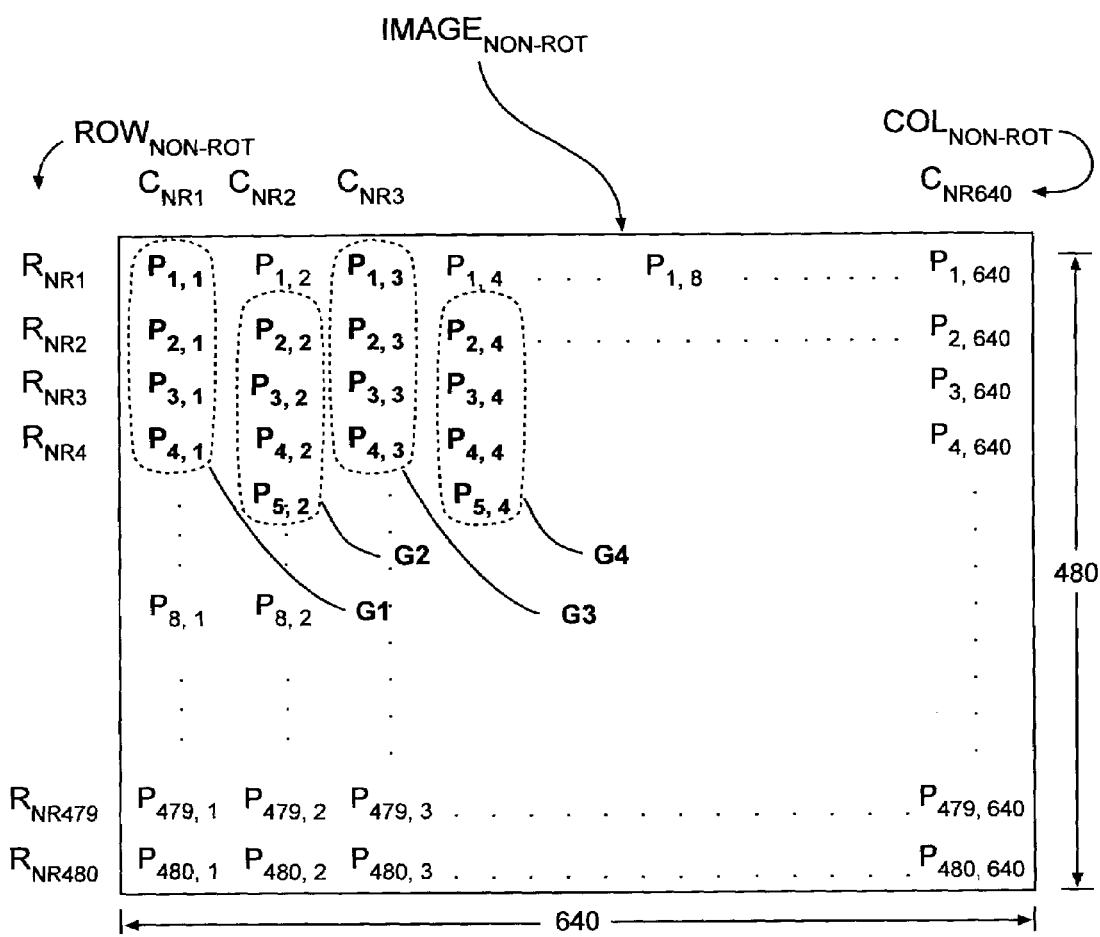
FIG. 19 is a schematic diagram showing the image matrix of FIG. 5 with pixels grouped according to the memory storage scheme of FIG. 18.

FIG. 18 shows yet another exemplary memory storage scheme 80 according to preferred embodiment. The memory portion 24a is shown with pixels $P_{m,n}$ stored therein according to scheme 80. FIG. 19 illustrates how pixels are mapped into memory 24a from a non-rotated image matrix according to scheme 80. FIG. 19 shows the non-rotated image matrix of FIG. 7 with pixels in a different grouping arrangement corresponding to the memory storage scheme shown in FIG. 18. The example is similar to the scheme 60, in that there are 4 groups (A=4) of 4-pixel portions (B=4) of image columns $C_{NR}$. FIG. 19 shows the memory portion 24a with four of the groups, i.e., G1-G4, stored in the first memory row $R_{M1}$. For example, the group G1 designates the 4-pixel portion $P_{1,1}$, $P_{2,1}$, $P_{3,1}$, $P_{4,1}$ from the image column $C_{NR1}$. The group G2 designates the 4-pixel portion $P_{2,2}$, $P_{3,2}$, $P_{4,2}$, $P_{5,2}$ from the image column $C_{NR2}$.

If the image to be displayed without rotation, then as a result of using the memory storage scheme 80, two pixels $P_{1,1}$ and $P_{1,3}$ that are needed for the first image row $R_{NR1}$ are stored in the memory row $R_{M1}$.

On the other hand, if the image is to be rotated for display (FIG. 8), the memory row $R_{M1}$ provides four pixels that are needed for the first image row $R_{R1}$, namely, $P_{1,1}$; $P_{2,1}$; $P_{3,1}$; and $P_{4,1}$. In other words, the Group G1 provides four of the pixels needed for the first image row $R_{R1}$ of the rotated image matrix IMAGE$_{ROT}$.

With respect to the exemplary memory storage scheme 80, it may be noted that particular pixels on the top and bottom edges of the image matrix may be grouped with other pixels on an opposite edge, according to a tiling pattern with wrapping tiles. For instance, the pixel $P_{1,2}$ in image 19 may be grouped with the pixels $P_{479,2}$ and $P_{480,2}$.

It may also be appreciated that everything stated in the above description applies equally well when substituting "image rows" for "image columns," due to the row-column symmetry of the image matrices. Hence, while the groups G are shown as being portions of image columns, they could equally well be portions of image rows. This can be appreciated by comparison of FIGS. 20 and 21.

Figure 20:
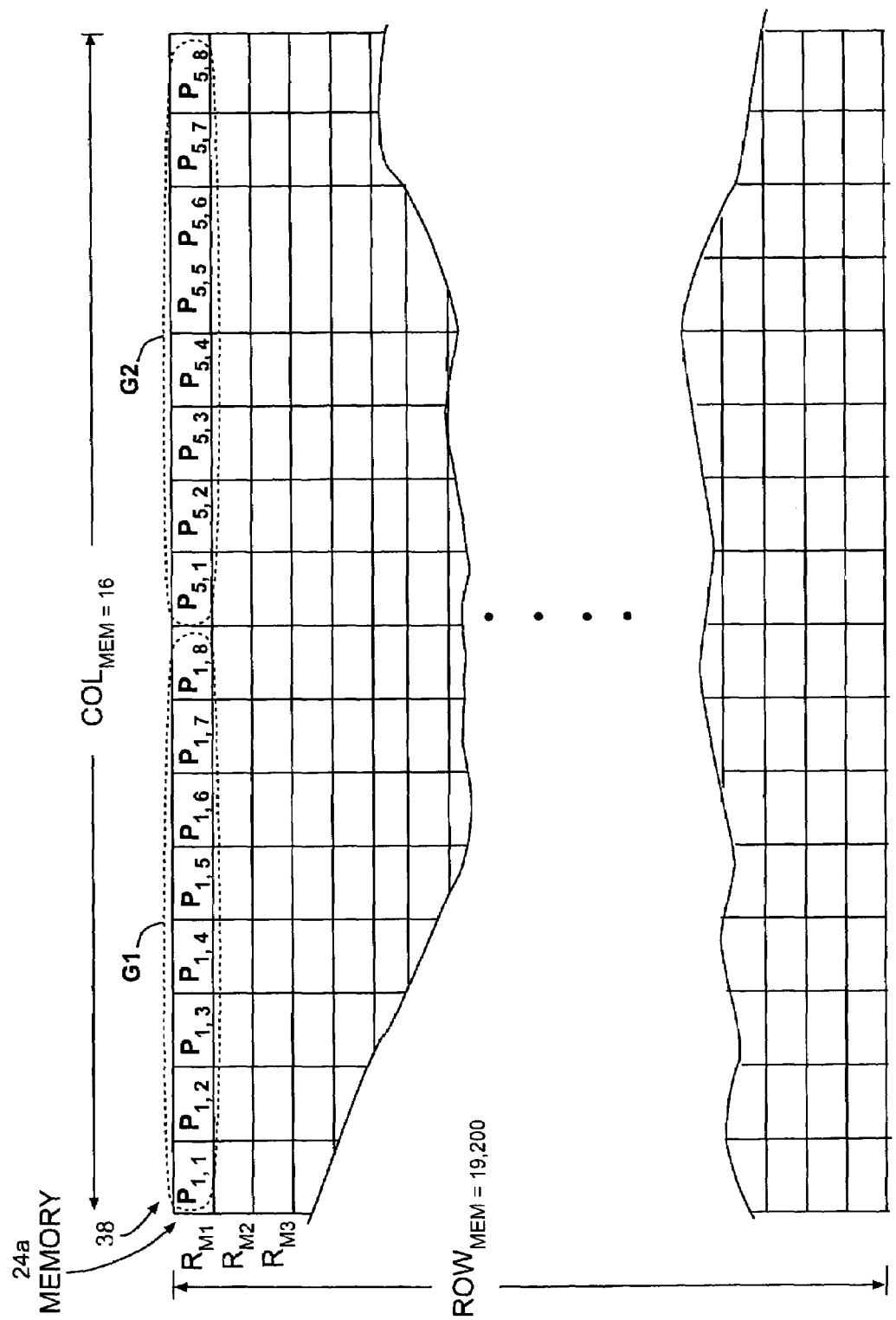
FIG. 20 is a schematic diagram of the memory of FIG. 9 organized according to a sixth exemplary memory storage scheme according to a preferred embodiment of the present invention.
Figure 21:
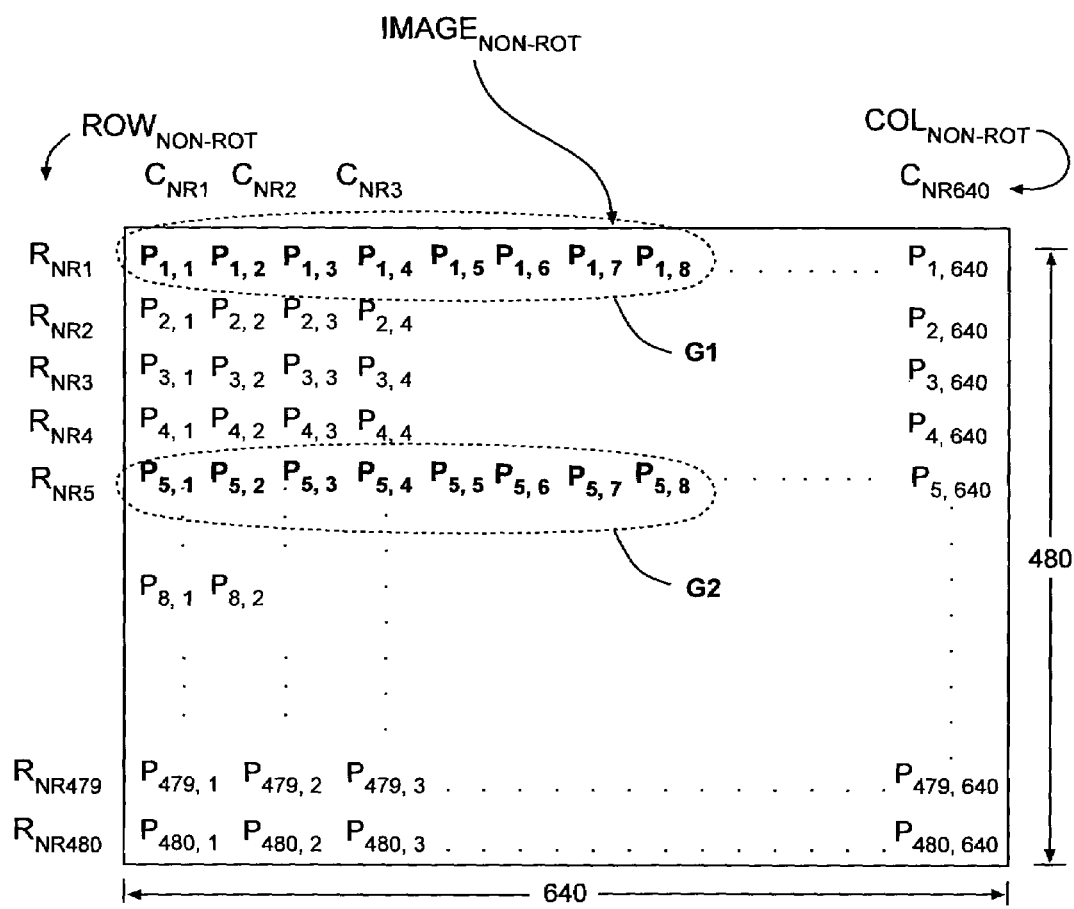
FIG. 21 is a schematic diagram showing the image matrix of FIG. 5 with pixels grouped according to the memory storage scheme of FIG. 20.

FIG. 20 shows another exemplary memory storage scheme 38 according to preferred embodiment. The memory portion 24a is shown with pixels $P_{m,n}$ stored therein according to scheme 38. FIG. 21 illustrates how pixels are mapped into memory 24a from a non-rotated image matrix according to scheme 38. FIG. 21 shows the non-rotated image matrix of FIG. 7 with pixels grouped according to image rows ROW$_{NON-ROT}$. There are 2 groups (A=2) of 8-pixel portions (B=8). The pixel portions are portions of image rows ROW$_{NON-ROT}$ The groups G1=$P_{1,1}$-$P_{1,8}$ from the image row $R_{NR1}$ and G2=$P_{5,1}$-$P_{5,8}$ from the image row $R_{NR5}$ are indicated particularly in the non-rotated image shown in FIG. 21.

If the image is to be display without rotatation, eight pixels $P_{1,1}$-$P_{1,8}$ (i.e., the group G1) of the first image row $R_{NR1}$ are stored in the memory row $R_{M1}$.

On the other hand, if the image is to be rotated for display, two of the pixels $P_{1,1}$ and $P_{5,1}$ needed for the image row $R_{R1}$ of the rotated image matrix IMAGE$_{ROT}$ (FIG. 8) are stored in the memory row $R_{M1}$.

The example of FIGS. 20 and 21 also illustrates that it is not necessary that the groups G in a single memory row be adjacent one another in the image matrix, the groups G1 and G2 here being spaced apart by three image rows ROW$_{NON-ROT}$.

Since the methodologies described herein are indifferent as to whether pixels groupings are specified in image rows or image columns, the term "vector" as used herein shall refer generically to either an image row or an image column in the context of 90 degree image rotations.

It is assumed herein that image rotations are in increments of 90 degrees, however the principles of a preferred embodiment could be applied to rotations having other angular increments. For example, preferred embodiments of image storage arrangements are directed to image rotations of 180 and 270 degrees.

The module 29a is preferably implemented in hardware, in the graphics controller 10. However, it should be understood that any of the features and functionalities described herein could be implemented in the graphics controller in a combination of hardware and software, or in software, provided the graphics controller is suitably adapted. For example, a program of instructions stored in a machine readable medium may be provided for execution in a processing device included in the graphics controller. Further, it should be understood that features and functionalities described herein as being provided by the graphics controller 10 may be provided outside of the graphics controller 10 without departing from the principles of the invention.

It is further to be understood that, while a specific graphics controller and method providing for efficient image rotation has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A method for efficient rotation of an image defined by an image matrix in which each datum corresponds with one image row and one image column of the image matrix, comprising:

mapping the data into a memory according to a mapping scheme, the memory being organized into memory rows and memory columns, each datum being mapped into a memory location corresponding with one memory row and one memory column, each memory location corresponding to one datum, the step of mapping including mapping at least two image vector portions into one of the memory rows, wherein a first one of the image vector portions includes at least two data, each of the at least two data corresponding to one of the image columns, a second one of the image vector portions includes at least two other data, each of the at least two other data corresponding to another of the image columns, the at least two vector portions together include at least two data of one of the image rows, but less than all of the data of any of the image rows, and each of the at least two vector portions are manned into consecutive columnar locations of the one memory row.

2. The method of claim 1, wherein the data of the first image vector portion correspond to particular image rows, and the data of the second image vector portion correspond to the same particular image rows.

3. The method of claim 1, wherein each image vector portion includes B data, and the memory includes C memory columns, and wherein the memory columns C equals the product of the number of data in each image vector portion and a number A of image vector portions in a memory row (C=B·A).

4. The method of claim 1, wherein the data of the image matrix are arranged in raster order.

5. The method of claim 4, further comprising fetching the data of the image matrix from the memory and transmitting the data read from the memory to a display device, the display area of the display device having display locations and being organized as a display matrix, the display matrix having display rows corresponding with the memory rows, and display columns corresponding with the memory columns, each display location corresponding with one display row and one display column, and each display location to render one datum.

6. A graphics controller providing for efficient rotation of an image defined by an image matrix in which each datum corresponds with one image row and one image column of the image matrix, comprising:

a first unit to map the data into a memory according to a mapping scheme, the memory being organized as memory rows and memory columns, the first unit mapping each datum into a memory location corresponding with one memory row and one memory column, each memory location corresponding to one datum, wherein the step of mapping including mapping at least two image vector portions into one of the memory rows, wherein a first one of the image vector portions includes at least two data, each of the at least two data corresponding to one of the image columns, a second one of the image vector portions includes at least two other data, each of the at least two other data corresponding to another of the image columns, the at least two vector portions together include at least two data of one of the image rows, but less than all of the data of any of the image rows, and each of the at least two vector portions are mapped into consecutive columnar locations of the one memory row.

7. The graphics controller of claim 6, wherein the data of the first image vector portion correspond to particular image rows, and the data of the second image vector portion correspond to the same particular image rows.

8. The graphics controller of claim 6, wherein each image vector portion includes B data, and the memory includes C memory columns, and wherein the memory columns C equals the product of the number of data in each image vector portion and a number A of image vector portions in a memory row (C=B·A).

9. The graphics controller of claim 6, wherein the data are pixel data.

10. The graphics controller of claim 6, wherein the data of the image matrix are arranged in raster order.

11. The graphics controller of claim 7, further comprising a display device and a second unit to transmit the data stored in the memory to the display device, the display area of the display device having display locations and being organized as a display matrix, the display matrix having display rows corresponding with the memory rows, and display columns corresponding with the memory columns, each display location corresponding with one display row and one display column, and each display location to render one datum.

12. A graphics display system providing for efficient rotation of an image defined by an image matrix in which each datum corresponds with one image row and one image column of the image matrix, comprising:

an image provider for providing the data;

a display device for rendering the data; and a graphics controller including a first unit to map each datum into a memory location of a memory according to a mapping scheme, the memory being organized into memory rows and memory columns, each memory location corresponding to one datum, wherein the mapping scheme including mapping at least two image vector portions into one of the memory rows, wherein a first one of the image vector portions includes at least two data, each of the at least two data corresponding to one of the image columns, a second one of the image vector portions includes at least two other data, each of the at least two other data corresponding to another of the image columns, the at least two vector portions together include at least two data of one of the image rows, but less than all of the data of any of the image rows, and each of the at least two vector portions are manned into consecutive columnar locations of the one first memory row.

13. The graphics display system of claim 12, wherein the image provider and the display device are remote from the graphics controller.

14. The graphics display system of claim 12, wherein the data of the first image vector portion correspond to particular image rows, and the data of the second image vector portion correspond to the same particular image rows.

15. The graphics display system of claim 14, wherein each image vector portion includes B data, and the memory includes C memory columns, and wherein the memory columns C equals the product of the number of data in each image vector portion and a number A of image vector portions in a memory row (C=B·A).

16. The graphics display system of claim 12, wherein the data of the image matrix are arranged in raster order.

17. The graphics display system of claim 12, wherein the data are pixel data.

18. The graphics display system of claim 12, further comprising a second unit to fetch the data of the image matrix from the memory and to transmit the data to the display device.

* * * * *

UNITED STATES PATENT AND TRADEMARK OFFICE
CERTIFICATE OF CORRECTION

| | | |
|---|---|---|
| PATENT NO. | : 7,512,287 B2 | Page 1 of 1 |
| APPLICATION NO. | : 11/188531 | |
| DATED | : March 31, 2009 | |
| INVENTOR(S) | : John Peter van Baarsen et al. | |

It is certified that error appears in the above-identified patent and that said Letters Patent is hereby corrected as shown below:

<u>Column 15,</u>
Line 7, please change "manned" to --mapped--

<u>Column 16,</u>
Line 40, please change "manned" to --mapped--

Signed and Sealed this

Second Day of June, 2009

JOHN DOLL
*Acting Director of the United States Patent and Trademark Office*